United States Patent
Russell et al.

(10) Patent No.: US 8,379,064 B2
(45) Date of Patent: *Feb. 19, 2013

(54) PULSE WIDTH MODULATION ALGORITHM

(75) Inventors: Andrew Ian Russell, Plano, TX (US); David Foster Lieb, Chicago, IL (US); Rajeev Ramanath, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/088,699

(22) Filed: Apr. 18, 2011

(65) Prior Publication Data

US 2011/0193894 A1   Aug. 11, 2011

Related U.S. Application Data

(60) Division of application No. 11/782,897, filed on Jul. 25, 2007, now Pat. No. 7,928,999, which is a continuation-in-part of application No. 11/696,033, filed on Apr. 3, 2007, now Pat. No. 7,876,340.

(60) Provisional application No. 60/909,877, filed on Apr. 3, 2007.

(51) Int. Cl.
  *G09G 5/10* (2006.01)

(52) U.S. Cl. .................................... 345/690; 345/108

(58) Field of Classification Search .............. 345/690, 345/108, 109; 353/81, 97, 98, 122; 348/771
See application file for complete search history.

(56) References Cited

U.S. PATENT DOCUMENTS

| | | |
|---|---|---|
| 5,663,749 A | 9/1997 | Farris |
| 5,765,934 A | 6/1998 | Okamori et al. |
| 6,201,521 B1 | 3/2001 | Doherty |
| 6,648,475 B1 | 11/2003 | Roddy et al. |
| 6,939,009 B2 | 9/2005 | Fischer et al. |
| 6,980,197 B2 | 12/2005 | Richards |
| 7,075,506 B2 | 7/2006 | Morgan |
| 7,113,324 B2 | 9/2006 | Lee et al. |
| 7,213,929 B2 | 5/2007 | Imade |
| 7,417,782 B2 | 8/2008 | Hagood et al. |
| 7,826,121 B2 | 11/2010 | Khan |
| 7,876,340 B2 | 1/2011 | Russell et al. |
| 2007/0053074 A1 | 3/2007 | Krijn et al. |
| 2008/0246706 A1 | 10/2008 | Russell et al. |

*Primary Examiner* — Ricardo L Osorio

(74) *Attorney, Agent, or Firm* — Warren L. Franz; Wade J. Brady, III; Frederick J. Telecky, Jr.

(57) ABSTRACT

In display systems employing spatial light modulators, the OFF-state light from OFF-state pixels of the spatial light modulator can be captured and directed back to the pixels of the spatial light modulator so as to recycle the OFF-state light in the display system. Bitplanes derived from the desired image to be produced are calibrated to include the recycled off-state light to properly produce the desired image using the display system.

11 Claims, 22 Drawing Sheets

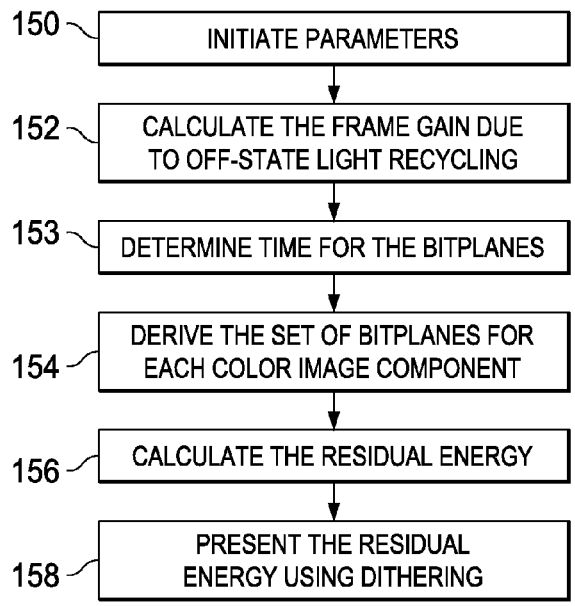
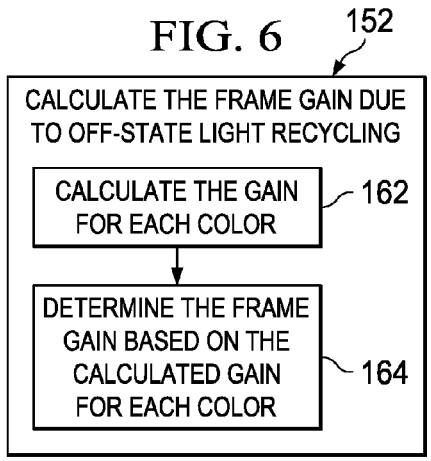
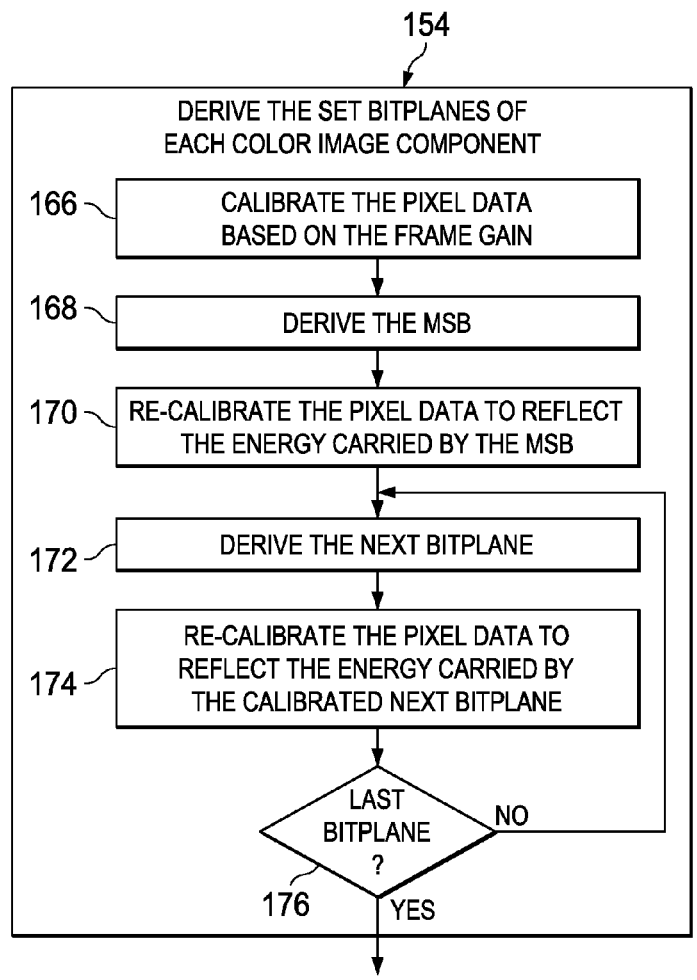

PULSE WIDTH MODULATION ALGORITHM

This application is a divisional of application Ser. No. 11/782,897, filed Jul. 25, 2007 which claims the benefit of provisional Application No. 60/909,877, filed Apr. 3, 2007 and is a continuation-in-part of application Ser. No. 11/696,033, filed Apr. 3, 2007, now U.S. Pat. No. 7,876,340.

CROSS REFERENCE TO RELATED CASES

This US patent application claims priority under 35 U.S.C. 119(e) of provisional US patent application "A PULSE WIDTH MODULATION ALGORITHM" to Russell, Ser. No. 60/909,877 filed Apr. 3, 2007; and this US patent application is a continuation-in-part of co-pending US patent application "A PULSE WIDTH MODULATION ALGORITHM" to Russell, Ser. No. 11/696,033, filed Apr. 3, 2007. The subject matter of each is incorporated herein by reference in its entirety.

This US patent application is also related to US patent application "OFF-STATE LIGHT RECAPTURING IN DISPLAY SYSTEMS EMPLOYING SPATIAL LIGHT MODULATORS" to Russell, Ser. No. 11/696,044 filed Apr. 3, 2007, the subject matter of which is incorporated herein by reference in its entirety.

TECHNICAL FIELD

The technical field of the examples to be disclosed in the following sections relates to the art of display systems, and more particularly, to pulse-width-modulation techniques for use in display systems employing spatial light modulators.

BACKGROUND

In current imaging systems that employ spatial light modulators composed of individually addressable pixels, a beam of incident light is directed to the pixels of the spatial light modulator. By setting the pixels at an ON state, the incident light is modulated onto a screen so as to generate bright image pixels on the screen, wherein such modulated light is referred to as the ON-state light; and the pixels at the ON state are referred to as ON-state pixels. By setting the pixels at an OFF state, the incident light is modulated away from the screen so as to cause dark pixels on the screen, wherein such modulated light is referred to as OFF-state light; and the pixels at the OFF state are referred to as OFF-state pixels. For obtaining a high contrast ratio, the OFF-state light is dumped or discarded by the imaging systems, which on the other hand, reduces the optical efficiency of the imaging system.

SUMMARY

In one example, a method for displaying an image is disclosed herein. The method comprises: directing a beam of incident light onto an array of pixels of a spatial light modulator, wherein each pixel is capable of being operated at a first state and a second state; modulating the beam of incident light into a first portion of light by pixels at the first state and a second portion of light by the pixels at the second state based on a set of bitplanes, further comprising: displaying each bitplane by the pixels for a time period that is determined based on a number of pixels in said each bitplane that cause the pixels of the spatial light modulator to the second state; directing the first portion of light from the spatial light modulator onto a display target, and the second portion of light from the spatial light modulator away from the display target; and recycling the second portion of light back to the pixels of the spatial light modulator.

In another example, a device for use in a display system employing a spatial light modulator having an array of pixels with each pixel capable of being operated at a first state and a second state that is different from the first state is disclosed herein. The device comprises: first means for deriving the bitplanes based on a sequence of color duty cycles; and second means for determining a clock speed at which the spatial light modulator is to be operated in displaying the bitplanes based on a number of off-states in each bitplane.

In yet another example, a display system is disclosed herein. The system comprises: a light source capable of providing a light beam; a spatial light modulator having an array of individually addressable pixels each being capable of modulating the light beam into a first portion of light when said each pixel is at a first state and a second portion of light when said each pixel is at a second state based on a set of bitplanes; a light recycling mechanism capable of recycling the second portion of light back to the spatial light modulator; and a system controller for controlling an operation of the spatial light modulator, further comprising a device that comprises: a bitplane module for deriving the bitplanes based on a sequence of color duty cycles; and a clock speed calculator in connection to the bitplane module for determining a clock speed at which the spatial light modulator is to be operated in displaying the bitplanes based on a determination of an amount of light to be recycled by the light recycling mechanism in displaying at least one of the derived bitplanes.

In still yet another example, a method for displaying a color image composed of a set of color image components is disclosed herein. The method comprises: directing a sequence of light beams of different colors to an array of pixels of a spatial light modulator; at a time when one of the light beams of a color is illuminating the spatial light modulator, modulating said one of the light beams into a first portion of modulated light and a second portion of modulated light by the pixels of the spatial light modulator; directing the first portion of modulated light onto a display target; and recycling at least a part of the second portion of the modulated light back to the pixels of the spatial light modulator.

In yet another example, a method for displaying an image is disclosed herein. The method comprises: directing a beam of light on an array of pixels of a spatial light modulator; modulating said beam of light by the pixels of the spatial light modulator into modulated light based on a modified bitplane; recycling at least a part of the modulated light back to the pixels of the spatial light modulator; and wherein said modified bitplane is obtained by a process comprising: deriving a bitplane from the image; and modifying the derived bitplane such that a first pixel of the derived bitplane is modified in a differently from a second pixel of the derived image.

In yet another example, a method of displaying a color image frame is disclosed herein. The method comprises: defining a set of colors comprising first and second colors for representing the color image frame; obtaining an energy distribution of the color image frame in the set of colors; re-distributing the energy in the set of colors by moving the energy of the first color into the energy of the second color; and displaying the image frame based on the re-distributed energy in set of colors.

In yet another example, a display system is disclosed. The system comprises: a light source capable of providing a light beam; a spatial light modulator having an array of individually addressable pixels each being capable of modulating the light beam into a first portion of light when said each pixel is at a first state and a second portion of light when said each pixel is at a second state based on a set of bitplanes; a light recycling mechanism capable of recycling the second portion of light back to the spatial light modulator; and a system controller for controlling an operation of the spatial light modulator, further comprising: a data formatter capable of converting the pixel data of the input image into the set of bitplanes; an average pixel calculator having an input connected to the input image for calculating an average pixel value of the input image; a real-time bit counter having an input coupled to the bitplanes for calculating a number of pixels in each bitplane that cause the pixels of the spatial light modulator to be at the second state; a clock speed calculator having a set of inputs connected to an output of the average pixel value calculator and an output of the real-time bit counter for calculating a clock speed based on the calculated average pixel data value and said number of pixels in each said bitplane; a clock speed adjustor having an input connected to an output of the clock speed calculator and an input coupled to a sequence of clock signals of the spatial light modulator provided by a clock of the display system; and a controller having an input connected to an output of the clock speed adjustor for operating the spatial light modulator at the adjusted clock speed.

In yet another example, a method for displaying a sequence of image frames using an array of individually addressable pixels of a spatial light modulator is disclosed. The method comprises: deriving a set of bitplanes from each image frame, wherein each bitplane has an index representing a relative position of the bitplane in the set of bitplanes; modulating, by the pixels of the spatial light modulator, a beam of incident light into ON-state and OFF-state light based on the bitplanes, further comprising: displaying a first bitplane of a first set of bitplanes derived from a first image frame of the image sequence that is displayed by the pixels of the spatial light modulator for a first time period; displaying a second bitplane of a second set of bitplanes derived from a second image frame of the image sequence that is displayed by the pixels of the spatial light modulator for a second time period; and wherein the first and second bitplanes have the same index; and the first and second time periods are different; directing the OFF-state light away from a display target and the ON-state light onto the display target; and re-routing the OFF-state light back to the pixels of the spatial light modulator.

In yet another example, a method for displaying an image is disclosed herein. The method comprises: directing a beam of light on an array of pixels of a spatial light modulator; modulating said beam of light by the pixels of the spatial light modulator into modulated light based on a modified bitplane; recycling at least a part of the modulated light back to the pixels of the spatial light modulator; and wherein said modified bitplane is obtained by a process comprising: deriving a bitplane from the image; and modifying the derived bitplane such that a first pixel of the derived bitplane is modified in a differently from a second pixel of the derived image.

BRIEF DESCRIPTION OF DRAWINGS

FIG. 5 is a flow chart of an exemplary pulse-width-modulation algorithm for use in determining bitplane data for a spatial light modulator in a display system that employs an off-state light recycling mechanism as illustrated in FIG. 1;

FIG. 6 is a flow chart showing the steps executed for calculating the frame gain due to the off-state recycling in the pulse-width-modulation algorithm shown in FIG. 5;

FIG. 7 is a flow chart showing the steps executed for calibrating the set of bitplanes to present the calibrated pixel data in the pulse-width-modulation algorithm shown in FIG. 5;

FIG. 24 and FIG. 25 schematically illustrates a method for calculating off-state pixels in bitplanes that are to be displayed by the spatial light modulator whose pixels are divided into reset groups; wherein FIG. 24 illustrates the array of pixels of the spatial light modulator divided into reset groups; and FIG. 25 illustrates an exemplary bit-counter for calculating off-state pixels based on reset groups;

DETAILED DESCRIPTION OF SELECTED EXAMPLES

In a typical existing display system employing a spatial light modulator, ON-state light from ON-state pixels of the spatial light modulator propagates towards the screen of the display system so as to generate a bright image pixel on the screen. The off-state light from off-state pixels of the spatial light modulator travels away from the screen so as to result in a dark pixel on the screen. Such off-state light is often dumped or discarded by the display system, which reduces the optical efficiency of the display system.

As an aspect of this disclosure, a mechanism for recycling the off-state light is provided, as will be discussed in the first part of this disclosure. Because most current display systems employing spatial light modulators operate based on bitplanes; and the bitplanes may cause different number of pixels at the OFF-state, the intensity of the recycled off-state light varies over time or over bitplanes. Such variation, in turn, causes distortion of the displayed image. This problem can be solved by calibrating the set of bitplanes derived from the desired image to include the energy of the recycled off-state light, as will be discussed in the second part of this disclosure. This problem can alternatively be solved by displaying the bitplanes derived from the desired image at dynamically adjusted clock speed, as will be discussed in the third part of this disclosure.

Off-State Light Recycling Mechanism

The off-state light from off-state pixels at a time can be captured and rerouted back to the pixels of the spatial light modulator. The rerouted off-state light, when illuminating the on-state pixels of the spatial light modulator, is converted to the ON-state light that can be projected to the screen so as to increase the brightness of the projected image. When illuminating the off-state pixels, the rerouted off-state light will be re-captured and then rerouted again to the pixels of spatial light modulator. This off-state light capturing and rerouting process is referred to as "off-state light recycling." A device having the capability of off-state light recycling in display systems is referred to as an off-state light recycling mechanism.

Figure 1:
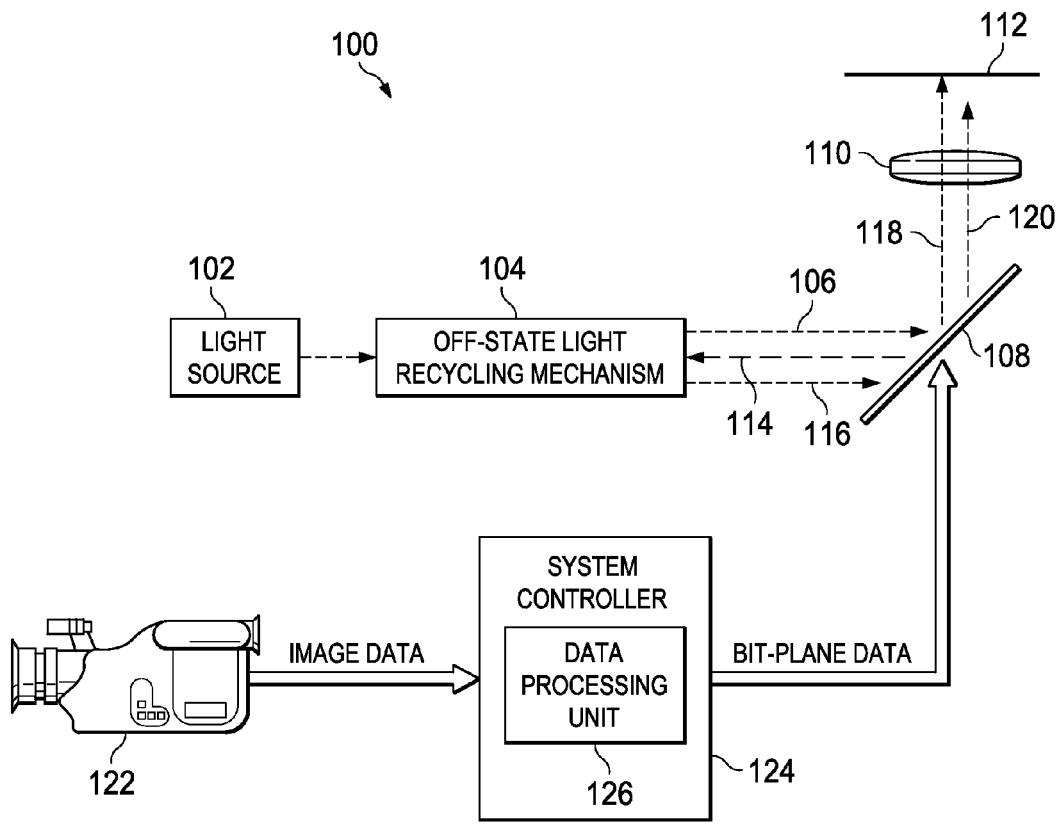
FIG. 1 diagrammatically illustrates a diagram of an exemplary display comprising an off-state light recycling mechanism.

As an example, FIG. 1 diagrammatically illustrates an exemplary display system in which an off-state recycling mechanism is implemented. In this example, display system 100 comprises light source 102, off-state light recycling mechanism 104, spatial light modulator 108, projection lens 110, display target 112, and system controller 124 that further comprises data processing unit 126. Multimedia source 122, such as video and image sources, is connected to the system controller for providing multimedia signals. It is noted that the multimedia source may or may not be a member of the display system. The display target (112) can be a screen on a wall or the like, or can be a member of a rear projection system, such as a rear projection television. In fact, the display system can be any suitable display system, such as a front projector, a rear projection television, or a display unit for use in other systems, such as mobile telephones, personal data assistants (PDAs), hand-held or portable computers, camcorders, video game consoles, and other image displaying devices, such as electronic billboards and aesthetic structures.

Light source 102 provides light for the imaging system. The light source may comprise a wide range of light emitting devices, such as lasers, light-emitting-diodes, arc lamps, devices employing free space or waveguide-confined nonlinear optical conversion and many other light emitting devices. In particular, the light source can be a light source with low etendue, such as solid state light emitting devices (e.g. lasers and light-emitting-diodes (LEDs)). When solid-state light emitting devices are used, the light source may comprise an array of solid-state light emitting devices capable of emitting different colors, such as colors selected from red, green, blue, and white. Because a single solid-state light emitting device generally has a narrow characteristic bandwidth that may not be optimal for use in display systems employing spatial light modulators, multiple solid-state light emitting devices can be used for providing light of each color so as to achieve optimal bandwidth for specific display systems. For example, multiple lasers or LEDs with slightly different characteristic spectra, such as 20 nm or less characteristic wavelength separation, can be used to produce a color light such that the characteristic spectra of the multiple lasers or LEDs together form an optimal spectrum profile of the display system. Exemplary laser sources are vertical cavity surface emitting lasers (VCSEL) and Novalux™ extended cavity surface emitting lasers (NECSEL), or any other suitable laser emitting devices.

Spatial light modulator 108 comprises an array of individually addressable pixels for spatially modulating the incident light onto or away from projection lens 110 that projects the modulated light onto screen 112 so as to reproduce images. The spatial light modulator may comprise pixels of many different natures, such as reflective and deflectable micromirrors and liquid-crystal-on-silicon (LCOS) devices. The pixels can be operated using binary or non-binary modes. In the binary mode, each pixel is switched between an ON and OFF state. At the ON state, each pixel modulates the incident light onto the projection lens (110). At the OFF state, each pixel modulates the incident light away from the projection lens. The ON-state light arrives at the screen (112) so as to construct the desired image; and the OFF-state is recycled by off-state light recycling mechanism 104 and redirected to the spatial light modulator, which will be discussed afterwards. The pixels of the spatial light modulator alternatively can be operated at a non-binary mode, such as an analog mode wherein multiple intermediate states are defined between an ON and OFF state; and the intermediate states may or may not be continuous between the ON and OFF states. In either binary or non-binary operation mode, color and gray images can be produced using a pulse-width-modulation technique, examples of which will be discussed afterwards.

OFF-state light recycling mechanism 104 is optically coupled to the propagation path of the off-state light that is modulated from the pixels of the spatial light modulator (108) such that the off-state light from the pixels at the OFF state of the spatial light modulator can be recaptured by the off-state light recycling mechanism. For redirecting the recaptured off-state light back to the pixels of the spatial light modulator, the OFF-state light recycling mechanism has a light exit end that is aligned to the propagation path of the incident light to the pixels of the spatial light modulator.

In the example illustrated in FIG. 1, incident light 106 from the light source is directed to spatial light modulator 108 that modulates the incident light (116) into ON-state light 107 and OFF-state light 114. The ON-state light travels towards projection lens 110; and is projected onto screen 112 by projection lens 110. OFF-state light 114 is recaptured by OFF-state light recycling mechanism 104 that is capable of converting the recaptured OFF-state light into incident light 116 and redirecting light 116 to illuminate pixels of spatial light modulator 108. At the spatial light modulator, incident light 116 may be modulated into ON-state light 117 that is collected by projection lens 110 and the OFF-state light that is recaptured by the off-state light recycling mechanism (104).

Because the OFF-state light from the spatial light modulator can be recaptured and redirected to the spatial light modulator, this recycling process improves the brightness of images produced on the screen. Such brightness improvement can be mathematically described as brightness gain as expressed in equation 1:

$$I = I_o G = I_o \frac{1}{1 - \varepsilon(1 - x)} \quad \text{(Eq. 1)}$$

In equation 1, G is the brightness gain due to OFF-state light recycling; I is the illumination intensity of light arriving at the screen including the recycled OFF-state light; and $I_o$ is the illumination intensity of light arriving at the screen without OFF-sate light recycling. $\varepsilon$ is the OFF-state light recycling efficiency that is defined as the fraction of the OFF-state light that re-illuminates the pixels of the spatial light modulator after a recycling process, compared to the total amount of OFF-state light to be recycled by the recycling process. x is the normalized number of ON-state pixels of the spatial light modulator at a time (e.g. during a bitplane time). Specifically, x can be expressed as equation 2:

$$x = \frac{N_{ON}}{N_{total}} \quad \text{(Eq. 2)}$$

wherein $N_{ON}$ is the number of ON-state pixels at a time; and $N_{total}$ is the total number of pixels involved in modulating the incident light. It is noted that $N_{total}$ may or may not be the total number of pixels of the spatial light modulator, especially when the spatial light modulator comprises active and inactive pixel areas. Pixels in inactive pixel areas of spatial light modulators are those pixels whose states in image display operations are independent from the data (e.g. bitplane data) derived from desired images; whereas pixels in active pixel areas are those whose states are associated with or determined by the image data.

Recycling efficiency $\varepsilon$ is primarily determined by the optical design of the off-state light recycling mechanism and the optical coupling of the off-state light recycling mechanism to the display system, particularly to the propagation path of the OFF-state light from the spatial light modulator and the propagation path of the light incident to the spatial light modulator. Ideally, $\varepsilon$ is 100%. In practice, $\varepsilon$ may be less than 100% due to imperfect optical coupling of the off-state light recycling mechanism to the propagation path of the off-state light from the spatial light modulator and/or to the propagation path of the incident light to the spatial light modulator and/or due to light leakage from imperfect optical design of the off-state light recycling mechanism. To maximize the brightness gain, it is preferred that $\varepsilon$ is maximized. In other examples, however, maximizing off-state light recycling may be impeded by other preferred system features, which results in balance between off-state recycling and the preferred features. For example, the off-state light recycling mechanism and/or the system design is desired to be cost-effective or desired to be volume compact or other reasons, poor $\varepsilon$ may be selected. In any instances, it is preferred that $\varepsilon$ is 10% or more, such as 20% or more, 30% or more, 40% or more, 50% or more, 60% or more, and 70% or more. As an example, table 1 shows the brightness gain achieved from different fractions of ON-state pixels (which can be converted to the number of ON-state pixels using equation 2) by assuming that the recycling efficiency $\varepsilon$ is 60%.

TABLE 1

| | % of ON-state pixels | | | | | | | | | | |
|---|---|---|---|---|---|---|---|---|---|---|---|
| | 0 | 10 | 20 | 30 | 40 | 50 | 60 | 70 | 80 | 90 | 100 |
| Brightness gain | 2.5 | 2.17 | 1.92 | 1.72 | 1.56 | 1.43 | 1.32 | 1.22 | 1.14 | 1.06 | 1 |

Figure 3:
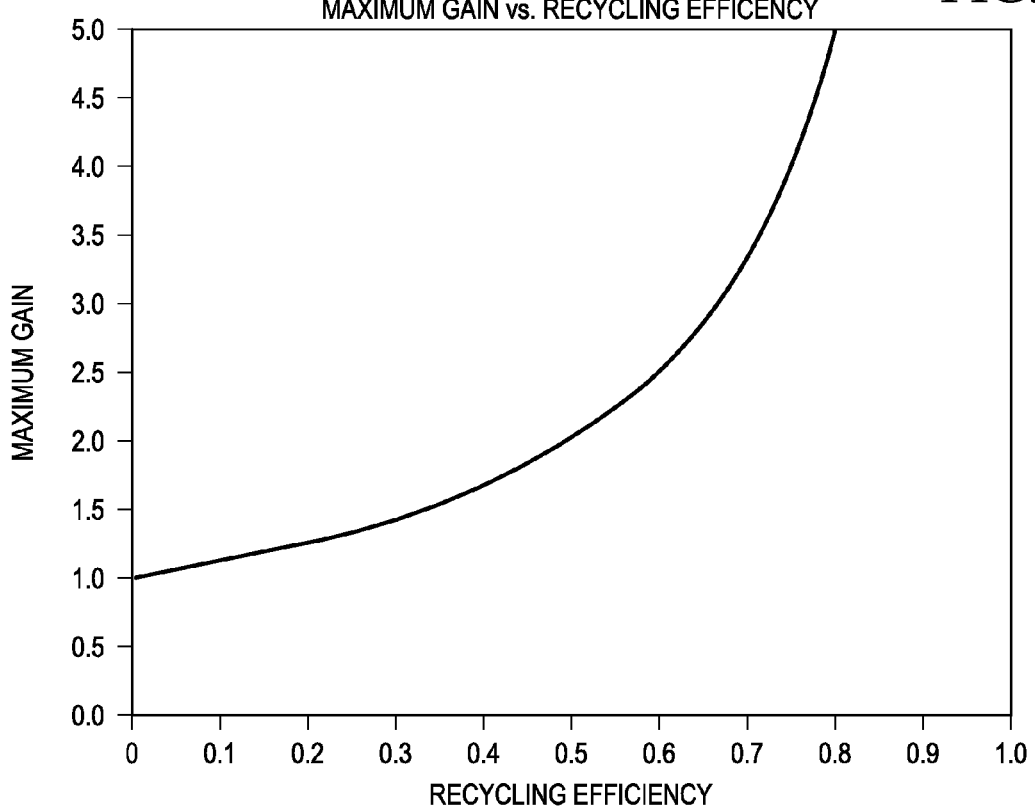
FIG. 3 shows a diagram of the maximum gain vs. the recycling efficiency.

An exemplary variation of the maximum gain with the recycling efficiency is presented in FIG. 3. The diagram in FIG. 3 assumes that all pixels of the spatial light modulator are at the OFF state. Accordingly, equation 1 is reduced to equation 3 with the recycling efficiency being the variable as shown in the following:

$$G = \frac{1}{1 - \varepsilon} \quad \text{(Eq. 3)}$$

As can be seen in FIG. 3, the maximum gain is 1 when the recycling efficiency $\varepsilon$ is 0; and the maximum gain is 5 when $\varepsilon$ is 0.8.

Figure 4:
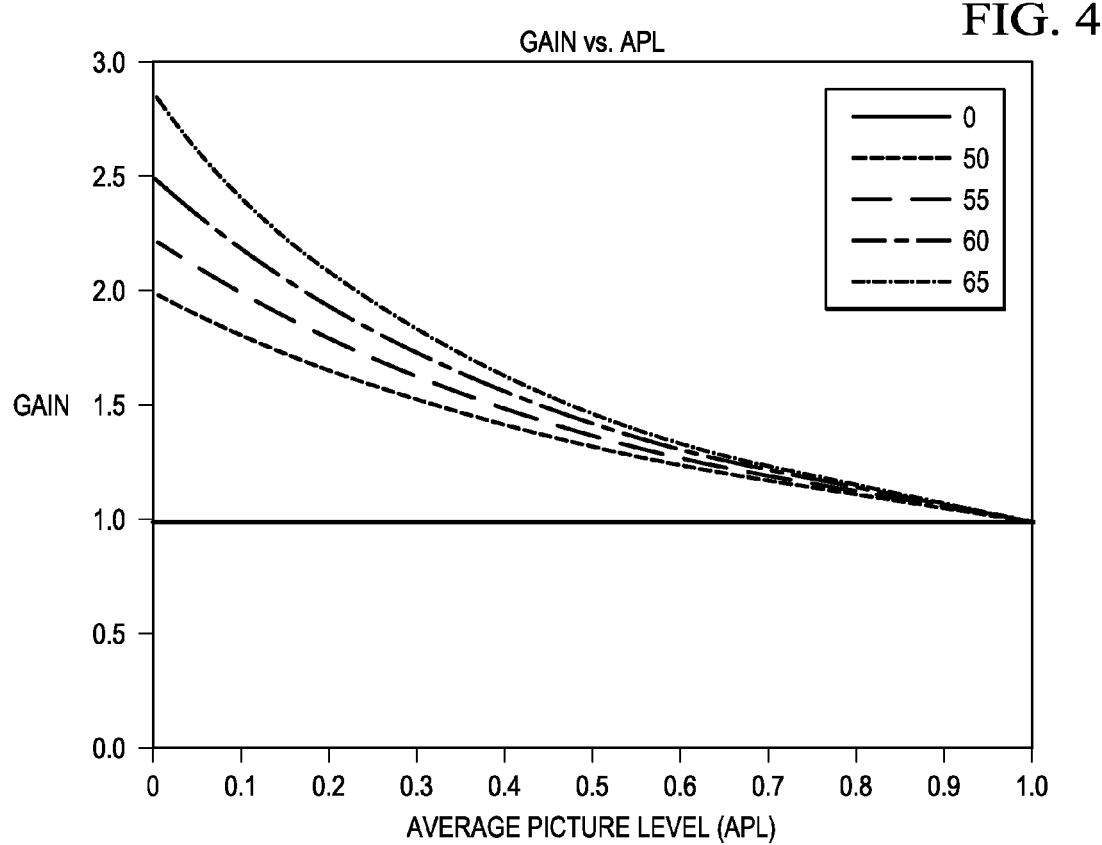
FIG. 4 shows a diagram of the gain vs. the average picture-level (APL) for different recycling efficiencies.

Because the gain is due to the off-state recycling, the amount of gain obtained through off-state recycling depends on the number of off-state pixels of the spatial light modulator during the recycling process. As an example, FIG. 4 presents a diagram of the gain vs. the average-picture-level (APL) in a bitplane with different curves representing different recycling efficiencies. The APL is defined as the fraction of the ON-state pixel data (e.g. the total number of "1") in a bitplane. As can be seen in FIG. 4, gain increases as APL decreases. A substantially white image has least gain, and thus least brightness boost; whereas a substantially dark image has the most gain, and thus the most brightness boost.

In addition to the brightness improvement as discussed above, the off-state light recycling has many other benefits. For example, the off-state recycling can also be used to increase the lifetime of the light source of the imaging system and/or to reduce the power consumption of the imaging system. Specifically, the light source can be operated as a lower power, as compared to imaging operations without off-state light recycling, during imaging operations but without sacrificing the brightness of the reproduced images. Operating the light source at reduced power certainly helps to increase lifetime of the light source, especially solid-state light sources, such as lasers and LEDs. Moreover, reduced power also reduces heat generated by the light source, which in turn increases lifetime of other components in the system by for example, reducing the commonly existing aging effect.

Figure 2:
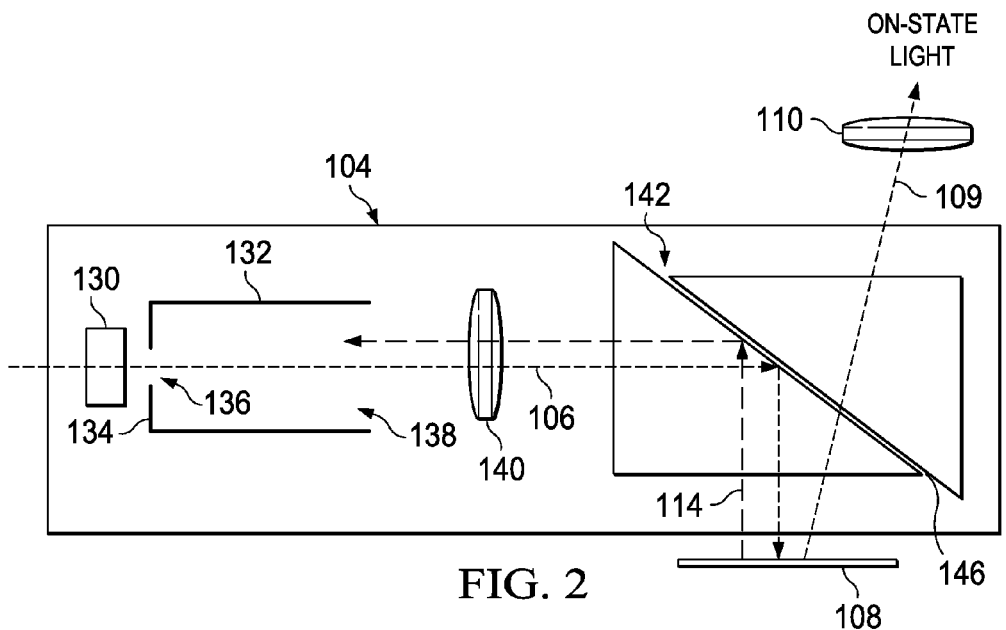
FIG. 2 is a block diagram illustrating an exemplary off-state light recycling mechanism illustrated in FIG. 1.

The off-state light recycling mechanism (104) as illustrated in FIG. 1 can be implemented in many possible ways, one of which is schematically illustrated in FIG. 2. Referring to FIG. 2, off-state light recycling mechanism 104 comprises optical diffuser 130, optical integrator 132, condensing lens 140, and prism assembly 142. For illustrating the relative positions of the off-state light recycling mechanism in the imaging system, spatial light modulator 108 and projection lens 110 in FIG. 1 are also shown in the figure.

Optical diffuser 130 is provided herein for homogenizing the light beam incident thereto and transforming the incident light beam, especially narrow-band or narrow-angle light beans from solid-state light emitting devices, into light beams with pre-determined illumination field profiles. A narrow-angle light beam is referred to a light beam with a solid-angle extension of 5 degrees or less, such as 2 degrees or less, 1 degree or less, 0.5 degree or less, and 0.2 degree or less. The homogenization capability of the optical diffuser is enabled by randomly or regularly deployed scattering centers. The scattering centers can be located within the body of the diffuser or in (or on) a surface(s) of the diffuser, which constitute the features responsible for directing the incident light into various spatial directions within the spread of the optical diffuser. Depending upon different locations of the scattering centers, the optical diffuser can be a volume optical diffuser where the scattering centers are within the bulk body of the diffuser, or a surface diffuser where the scattering centers are on the surface of the bulk body of the diffuser. In one example, the optical diffuser can be a surface diffuser, such as a standard engineered diffuser. Even though not required, the optical diffuser can be used when the light source (102 in FIG. 1) employs solid state (or narrow band) light sources. In other examples, such as the light source uses arc lamps, the optical diffuser may be replaced by an optical lens, such as a condensing lens, which is not shown in the figure. A lens combined with smaller angle or spatial diffusers can also be used.

The optical integrator (132) comprises opening 136 formed in end wall 134 of the optical integrator. Side wall 134 has interior surface coated with a reflective layer for reflecting the light incident thereto. In particular, the interior surface of side wall 134 is used to reverse the direction of the incident light such that the off-state light recaptured at the other end (138) of optical integrator 132 can be bounced back to travel towards the spatial light modulator. For this purpose, the reflective layer coated on the interior surface of side wall 134 can be a totally-internally-reflecting (TIR) surface for the OFF-state light.

Opening 136 provided in side wall 134 is designated for collecting the light beams from the light source and directing the collected light towards the spatial light modulator (108). Accordingly, opening 136 is optically aligned to the propagation path of the incident light from the light source, as illustrated in the figure.

Because the opening (136) is provided to collect the incident light and the opening is in the side wall 134 that is designated to bounce the recaptured off-state light, the opening has a preferred dimension such that off-state light leakage from the opening is minimized while collection of the incident light from the light source is maximized. The opening may have a dimension that matched to the dimension of the light incident thereto, such as the dimension of the illumination field of the light beam at the location of side wall 134. As an example, the width or height of the opening can be 1 mm or less, such as 0.5 mm or less, and 0.2 mm or less. The opening may have any desired shape, such as circle, rectangle, and square.

The other end (138) of optical integrator 132 is designated to capture the off-state light from the spatial light modulator (108). To maximize the capturing of the off-state light, side 138 of optical integrator 132 is substantially open; and the opened portion is optically aligned to the propagation path of the off-state light from the spatial light modulator. In particular, the opening portion of side 138 can be optically aligned to the illumination field of the off-state light at the location of side 138. Even though it is shown in the figure that side 138 and side 136 are substantially parallel and substantially have the same dimension, it is not required. In other examples, side 138 may have a shape and/or a dimension different from that of side 134, in which instance, optical integrator 132 can be tapered or extended from one end (e.g. side 134) to the other (e.g. side 138). Alternatively, optical integrator 132 can be assembled with another optical integrator or a suitable optical element (e.g. lens) such that capturing the off-state light from the spatial light modulator can be maximized.

Optical integrator 132 may have a solid body, such as a body filled with an optical material (e.g. glass) that is transmissive to the incident light. The optical integrator may alternatively comprise a hollowed body, such as an empty space surrounded by multiple reflective walls, one end-side wall 134, and the other end-side wall 138, as discussed above.

The incident light (106), including the light from the light source and the recycled light from the off-state light recycling mechanism, is then guided to the spatial light modulator by condensing lens 140 and prism assembly 142. For properly directing the incident light onto the pixels of the spatial light modulator (108) and spatially separating the ON-state and OFF-state light, the prism assembly employs TIR surface 146. Specifically, TIR surface 146 is optically disposed such that the incident light can be reflected to the spatial light modulator at a pre-determined direction; the off-state light (114) from the pixels at the OFF state can be directed towards side 138 of the off-state light recycling mechanism; and the ON-state light (109) from the spatial light modulator can travel through the TIR surface towards the projection lens (110). These can be achieved by aligning the TIR surface (146) such that the incident light and OFF-state light impinge the TIR surface at incident angles equal to or greater than the critical angle of the TIR surface; whereas the ON-state light impinges the TIR surface at an incident angle less than the critical angle of the TIR surface.

Condensing lens 140 is provided to form a proper illumination field on the TIR surface (146) such that the image of such illumination field projected on the spatial light modulator by the TIR surface has a proper optical profile. For example, the profile has an illumination area matching the pixel area of the spatial light modulator and/or the illumination intensity is substantially uniform across the pixel area. A proper optical profile can be achieved by adjusting the relative positions of condensing lens 140, TIR surface 146, and spatial light modulator 108.

In the example shown in FIG. 2, optical integrator 132 is disposed on the optical path of the light from the light source. A benefit of this configuration is that the recycled off-state light can be re-directed to the spatial light modulator along the same propagation path of the incident light from the light source, thus simplifying the optical design. In other alternative examples, the optical integrator can be disposed such that the optical axis of the optical integrator is not aligned to the incident light path. In this instance, opening 136 may not be formed. Moreover, alternative to using a prism assembly with a TIR surface as shown in FIG. 2, the off-state recycling mechanism can employ an optical fiber or other suitable optical devices.

It is noted that FIG. 1 and FIG. 2 illustrate only one of many possible off-state light recycling mechanisms and display systems using the same. Other variations are also applicable, such as those set forth in US patent application "OFF-STATE LIGHT RECAPTURING IN DISPLAY SYSTEMS EMPLOYING SPATIAL LIGHT MODULATORS" to Russell et al., Ser. No. 11/696,044 filed on the same say as this US patent application, the subject matter of which is incorporated herein by reference in its entirety.

A Pulse-Width-Modulation Algorithm

For properly reproducing grayscale and color images, each pixel of the spatial light modulator (e.g. 108 in FIG. 1) can be turned on and off at a rate faster than the human eyes can perceive such that the pixel appears to have an intermediate intensity proportional to the fraction of the time when the pixel is on. This method is generally referred to as pulse-width-modulation (PWM). Specifically, each image pixel of a grayscale image is represented by a plurality of pixel data bits (e.g. 4-bits, 8-bits, 16-bits, 32-bits, and 64-bits); and each pixel data bit is assigned a significance. Each time the pixel of the spatial light modulator is addressed, the value of the pixel data bit determines whether the addressed pixel is on or off; and the bit significance determines the duration of the pixel at the on-state or the off-state. A collection of pixel data bits of the same significance for the image pixels is referred to as a bitplane. During a frame period, a number of bitplanes is displayed by the pixels of the spatial light modulator so as to produce grayscale levels of the desired image. It is noted that a bitplane can be a collection of pixel data bits for all or a portion of image pixels of the desired image. As a way of example as set forth in U.S. Pat. No. 6,201,521 to Doherty issued Mar. 31, 2001, the subject matter being incorporated herein by reference in its entirety, the pixel array of a spatial light modulator can be arranged into multiple reset groups. A set of groups of bitplanes is derived from an image to be displayed (the desired image) such that each bitplane corresponds to a reset group that displays said each bitplane; the bitplanes in each group have the same significance; and all bitplanes in each group collectively correspond to all pixel data bits having the same significance of the desired image.

At a particular time, bitplanes of the same group (having the same significance) can be displayed by the pixels of the spatial light modulator. Alternatively, bitplanes of the same group can be displayed at different time periods. In other words, the bitplanes being displayed by the pixels of all reset groups of the spatial light modulator at each time can be from the same group (of the same significance); or can be from different groups (of different significances).

Conversion of the pixels data (e.g. RGB data and YPbPr) of the incoming image or video signals into bitplane data can be performed in many ways, such as those set forth in U.S. Pat. No. 7,075,506 to Morgan, issued Jul. 11, 2006, U.S. Pat. No. 5,663,749 to Farris issued Sep. 2, 1997, and U.S. patent application Ser. No. 10/648,608 to Richards filed Aug. 25, 2003, the subject matter of each being incorporated herein by reference in its entirety. Such data conversion can be accomplished by a designated functional module, such as data processing unit 126, which can be a member of system controller 124 that is used to control operations of other functional members of the display system, as shown in FIG. 1. It is noted that the data processing unit can be a software module having a set of computer-executable instructions or an electronic circuit, such as a field-programmable-gate-array circuit, application-specific-integrated-circuit, and other suitable circuits.

Because different bitplanes can cause different numbers of on-state and off-state pixels in the spatial light modulator, the amount of recycled off-state light varies over bitplanes for a given off-state light recycling mechanism. Such variation in turn causes unwanted illumination intensity changes on the screen in reproducing the desired image. As a consequence, the bitplanes derived from the desired image when displayed by the pixels of the spatial light modulator do not result in the desired image on the screen. This problem can be solved by many methods, one of which is by deriving the bitplanes from the desired image while including the illumination intensity variations due to recycled off-state light such that the derived bitplanes, when displayed by the pixels of the spatial light modulator in the presence of off-state light recycling, can yield the desired image on the screen. This bitplane derivation process can be performed by the data processing unit (126) as shown in FIG. 1.

As an example, FIG. 5 shows a flow chart having steps executed for performing an exemplary bitplane derivation process. Because the bitplane derivation process is intended to generate bitplanes while including the effect of off-state light recycling, parameters characterizing the off-state light recycling process, such as recycling efficiency ϵ, as well as other parameters characterizing the incoming video and image signals, such as parameters characterizing chromatic and/or intensity components of the incoming video or image signals, are initialized (step 150). Based on the initialized parameters, frame gain $g_{frame}$ is calculated (step 152) based on gains $g_i$ of chromatic components of the incoming image frame due to off-state light recycling during the frame period. An exemplary calculation of frame gain is shown in the flow chart in FIG. 6.

Referring to FIG. 6, the gain due to off-state light recycling is calculated for each color component (step 162) in the linear light space after de-gamma application. For example, assuming the incoming image frame comprises red, green, and blue color image components, gains $g_{red}$, $g_{green}$, and $g_{blue}$ for red, green, and blue color image components are calculated using equation 4 shown in the following:

$$g_i = \frac{1}{1-\varepsilon(1-A_i)} \quad \text{(Eq. 4)}$$

$i$ = red, green, and blue colors

In equation 4, $A_i$ is the average pixel level (the average value of the pixel data in linear light space) of the $i^{th}$ color image component during the frame period. Given the calculated gain for each color components, the frame gain $g_{frame}$ is determined (step 164) such that the frame gain $g_{frame}$ is equal to or less than the minimum gain of the color image components, which can be expressed as equation 5:

$$g_{frame} \leq \text{Min}(g_i) \quad \text{(Eq. 5)}$$

In one example, frame gain $g_{frame}$ is set to the minimum gain of the color image components. In other examples, the frame gain $g_{frame}$ is less than the minimum gain of the color image components by a predetermined value Δ that can be 20% or less, 10% or less, and 5% or less of the minimum gain of the color image components.

Referring again to FIG. 5, with the calculated frame gain at step 152, time periods for displaying bitplanes to be derived in the following from each color image color component of the desired image are calculated so as to include the effect the off-state light recycling (step 153). As compared to existing bitplane display technologies wherein each bitplane is displayed for a time period that is determined by the significance or weight of the bitplane, the bitplane in an example of this disclosure is instead displayed by the pixels of a spatial light modulator for a time period that is related the off-state recycling efficiency as well as the significance of the bitplane. The display periods can be calculated in many ways. As an example, assuming the specific color image component is to be displayed for 1 unit time, this one unit time can be dissected into multiple time slots for the bitplanes, as well as a S™ bitplane. The STM bitplane is used to present residual intensities as will be discussed afterwards. The largest time slot of the one unit time can be 1/(2−log(1−ε)) to be able to correctly display the specific image component. In other words, to use the fewest number of bitplanes to correctly display the desired image, each bitplane time should be 1/(2−log(1−ε)) of the time remaining. For example, after setting the MSB bitplane time to 1/(2−log(1−ε)), the second bitplane would be set to 1/(2−log(1−ε)) of the remaining time. For example, the time slot for each bitplane is desired to be ⅓ of the total left time when c is 0.6321. Specifically, the time slots for the calibrated bitplanes can be, from the last (LSB) to the first (MSB), 2, 1, 3/2, 9/4, 27/8, 81/16 . . . . In other examples, the largest time slot of the one unit time can be calculated in many other ways. For example, the largest time slot can be (1−ε)/(2−ε). With the calculated frame gain and display time, bitplanes can be calculated from each color image component so as to include the intensity variation due to the off-state light recycling (step 154). This bitplane calculation involves many steps; and an exemplary calculation process is illustrated in FIG. 7.

Referring to FIG. 7, pixel data of the incoming image frame is calibrated at step 166 by multiplying the pixel data by the determined frame gain $g_{frame}$ due to the off-state recycling. The underlying theory of such calibration can be obvious from the above description with reference to equation 1. It is noted that the calibrated pixel data represent a calibrated intensity that includes the intensity due to recycled off-state light that may vary over different bitplanes of the image frame. Such calibrated intensity is the intensity to be accomplished through a set of bitplanes, which will be detailed afterwards. As an example, FIG. 8 plots an exemplary calibrated pixel data curve for a particular color image component of an image frame.

Figure 8:
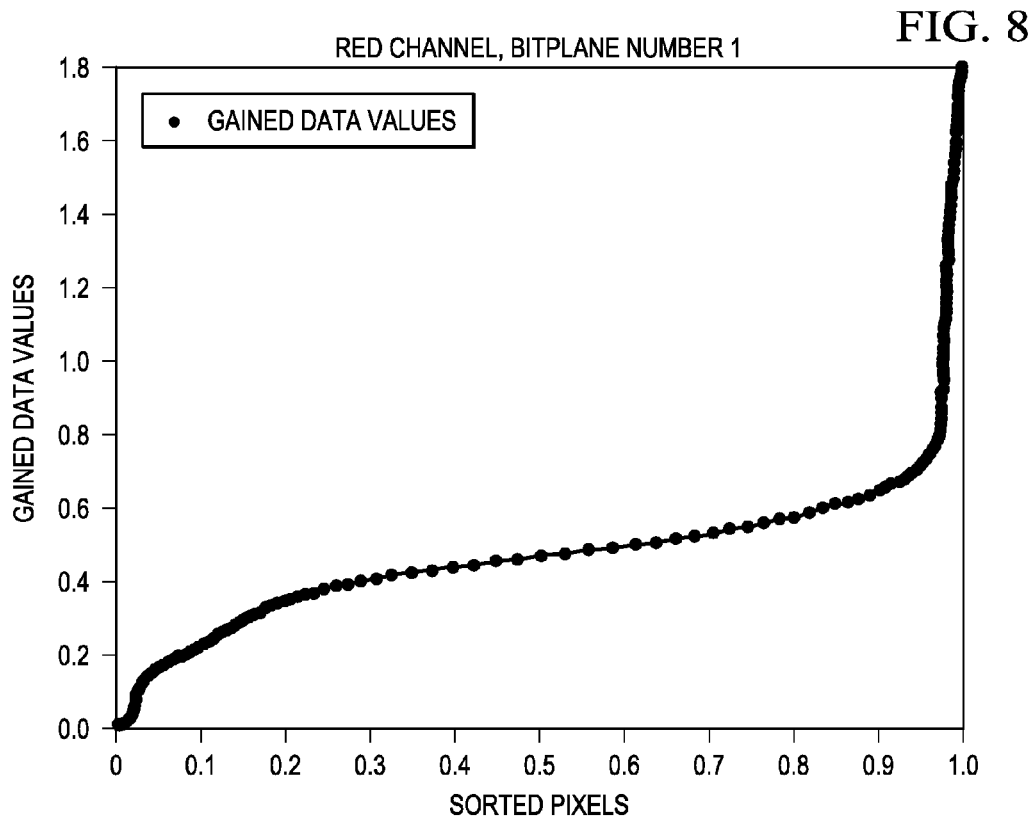
FIG. 8 shows a diagram of the calibrated pixel data sorted left to right from smallest to largest for the red color component of the image shown in FIG. 21$b$.

Referring to FIG. 8, it is assumed that the image frame has 8-bits depth. The image frame, as well as each color image component thereof, therefore has 256 different gray levels. Accordingly, pixel data of each color image component has up to 256 different values ranging from 0 to 255. In other examples, the image frame may have other image depths, such as 4 bits, 6 bits, 10 bits, and 12 bits. For demonstration purpose only, FIG. 8 further assumes that the frame gain $g_{frame}$ is 1.8. The vertical axis (i.e. Y axis) plots the calibrated pixel data of the particular pixel color image component (e.g. red color image component) of the image frame, whereas the calibrated pixel data is scaled within the range from 0 to the frame gain $g_{frame}$[0, 1.8]. The horizontal axis (i.e. X axis) plots indices of image pixels having the pixel data plotted in the vertical axis with the image pixels being sorted based on their calibrated pixel data values. Specifically, image pixels 0 (the upper-left corner image pixel) through P (the bottom-right corner image pixel) are sorted into image pixel groups based on their calibrated pixel data. Each sorted image pixel group (which comprises one or more image pixels) is assigned to an index ranging from 0 to 1. As such, each index (and the X axis value) is associated with the pixel(s) of an image pixel group having the same calibrated pixel data (Y axis value). In an alternative example, X axis can plot a cumulative histogram of all image pixels, sorted by their calibrated pixel data. For example, an X-value of 0.35 means that 35% of the image pixels in the color image component are below the corresponding Y value (pixel data value). The principles of calculating the bitplanes as discussed below is also applicable to the instance wherein the X-axis plots the cumulative histogram, and to other equivalent variations. Given the calibrated pixel data and the calibrated pixel data curve, the set of bitplanes are calculated. The bitplanes can be calculated sequentially from the most-significant-bit (MSB, the first bitplane) to the least-significant-bit (LSB, the last bitplane), which will be detailed in the following with reference to a particular example wherein the desired image has 8-bits of grayscale. It will be appreciated by those skilled in the art that the following discussion is for demonstration purpose, and should not be interpreted as a limitation. Instead, images with any grayscale depths are also applicable. It is further noted that the bitplanes can be in any desired format, such as binary and non-binary.

Figure 9:
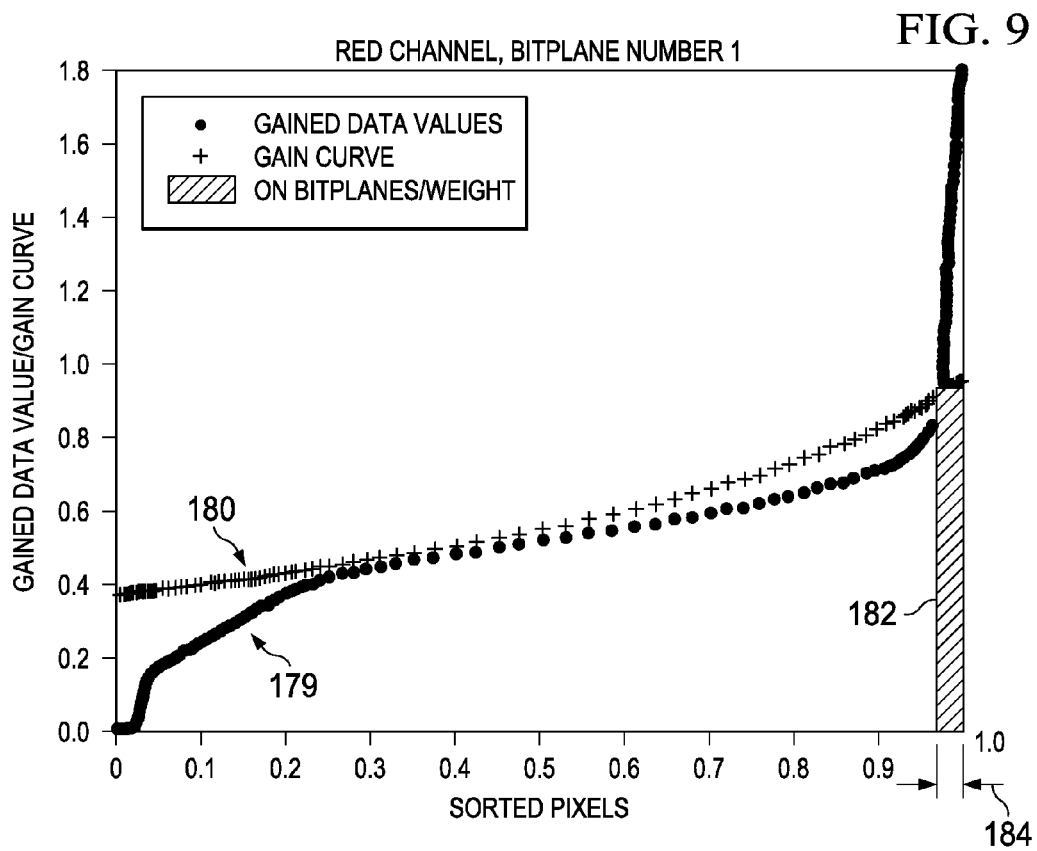
FIG. 9 and FIG. 10 show an exemplary method of calibrating the first bitplane for the red color image component of the image in FIG. 21$b$.

Referring again to FIG. 7, calculation of the bitplanes following the calibration of the pixel data (step 166) can start from a calculation of the MSB (step 168), which is better demonstrated in FIG. 9. Referring to FIG. 9, curve 179 plots the calibrated pixel data as discussed above with reference to FIG. 8. Gain curve 180 plots the weight of the MSB bitplane to be calculated for the specific color image component, which can be expressed as equation 6:

$$\text{weight} = \text{time}_{bitplane} \frac{1}{1 - \varepsilon(1 - x_i)} \quad \text{(Eq. 6)}$$

In equation 6, $x_i$ is the ratio of the number of ON-state pixels to the total number of pixels in the $i^{th}$ bitplane; $\text{time}_{bitplane}$ is the time allotted to the $i^{th}$ bitplane as discussed above with reference to step 153 in FIG. 5; and ε is the off-state light recycling efficiency. When all pixels are at the ON-state or when the recycling efficiency is zero, there is no off-state recycling. The weight of the bitplanes as expressed in equation 6 represents the effective brightness (or resulted illumination intensity) of the $i^{th}$ bitplane. It can be observed from equation 6 that the weight of the bitplane may vary over image frames even for the same indexed bitplanes (e.g. the MSB and LSB bitplanes) in different image frames.

Based on the calibrated pixel data curve and gain curve of MSB bitplane, the MSB bitplane is calculated according to the pixel data and an upper threshold. Specifically, the MSB bits of the image pixels (plotted in the X axis as shown in FIG. 8) having pixel data equal to or higher than the upper threshold are set to the ON-state (e.g. "1"), while the MSB bits of the image pixels having pixel data lower than the threshold are set to the OFF-state. In an example, the upper threshold is the point at which the calibrated pixel data is equal to or higher than the bit-weight given by the gain curve (180). An example of such upper threshold is the crossing point (182) of calibrated pixel data curve 179 and gain curve 180. All pixels (i.e. pixels in region 184) having the calibrated pixel data equal to or above the upper-threshold are set to the ON-state. In the instance when the gain curve (weight curve) and the calibrated pixel data curve have multiple intersections, the upper-threshold can be selected from the multiple intersections such that the most pixels are turned on with such upper-threshold. It is noted because each coordinate in the horizontal axis is associated with one or a group of image pixels as discussed above, turning on the pixels in region 184 can be accomplished through associations of the horizontal coordinates to the individual image pixels. After determining the MSB (the first) bitplane, other bitplanes are sequentially calculated.

Figure 10:
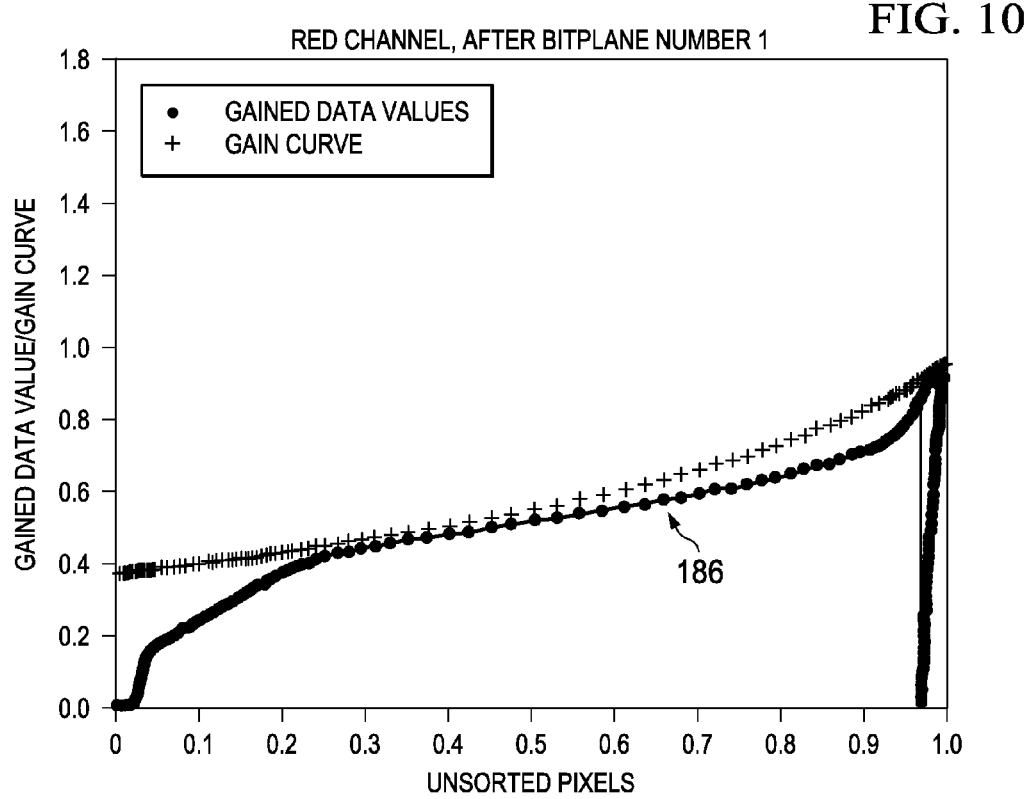

Referring again to the flow chart in FIG. 7, the calibrated pixel data is adjusted (step 170) to eliminate the energy (intensity) carried by the above determined MSB bitplane before calibrating other bitplanes. Specifically, such adjustment is performed by subtracting the energy carried by the MSB bitplane from the calibrated pixel data, as demonstrated in FIG. 10. As shown in FIG. 10, curve 186 plots the calibrated bitplane data curve (179 in FIG. 9) after the adjustment. This adjusted calibrated-pixel-data curve can then be used to calibrate the next (the second) bitplane (step 172 in FIG. 7), which is better illustrated in FIG. 11.

Figure 11:
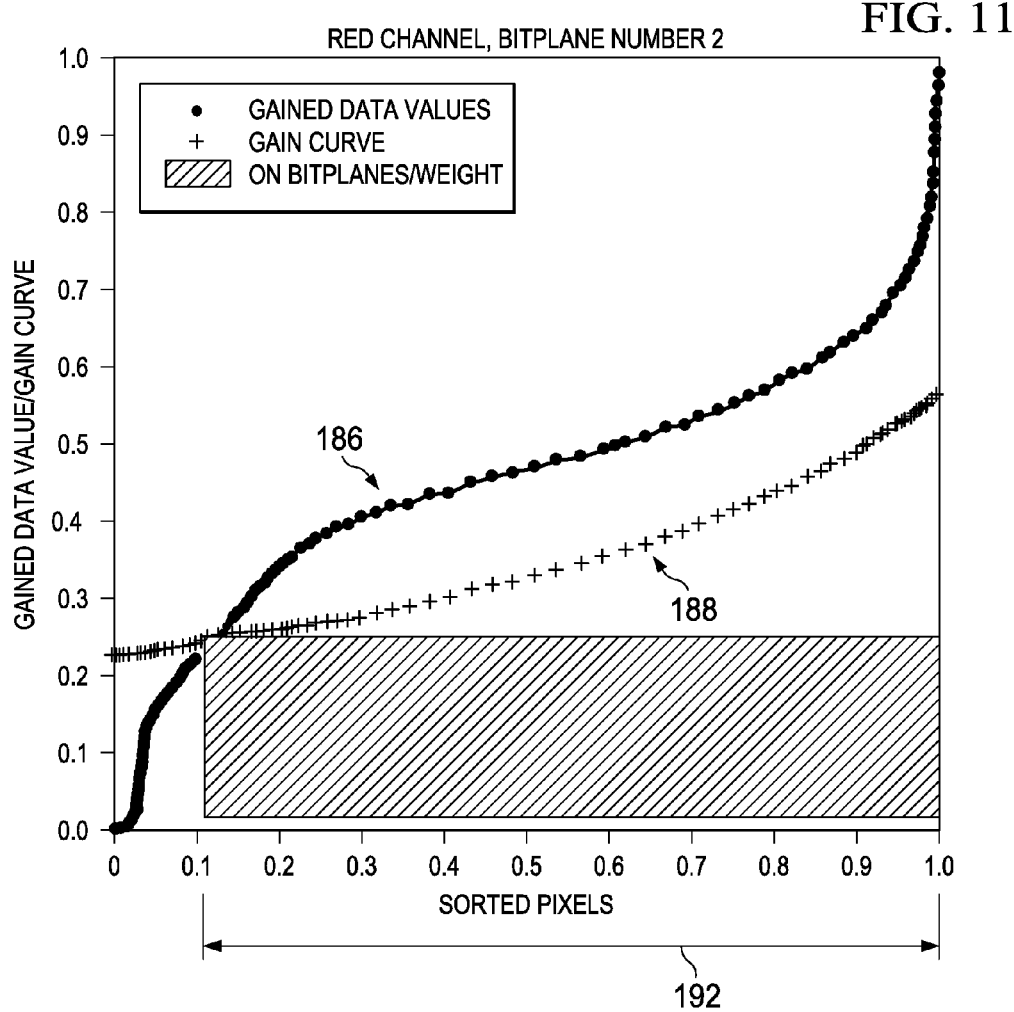
FIG. 11 and FIG. 12 show a method of calibrating the second bitplane for the red color image component of the image in FIG. 21$b$.
Figure 12:
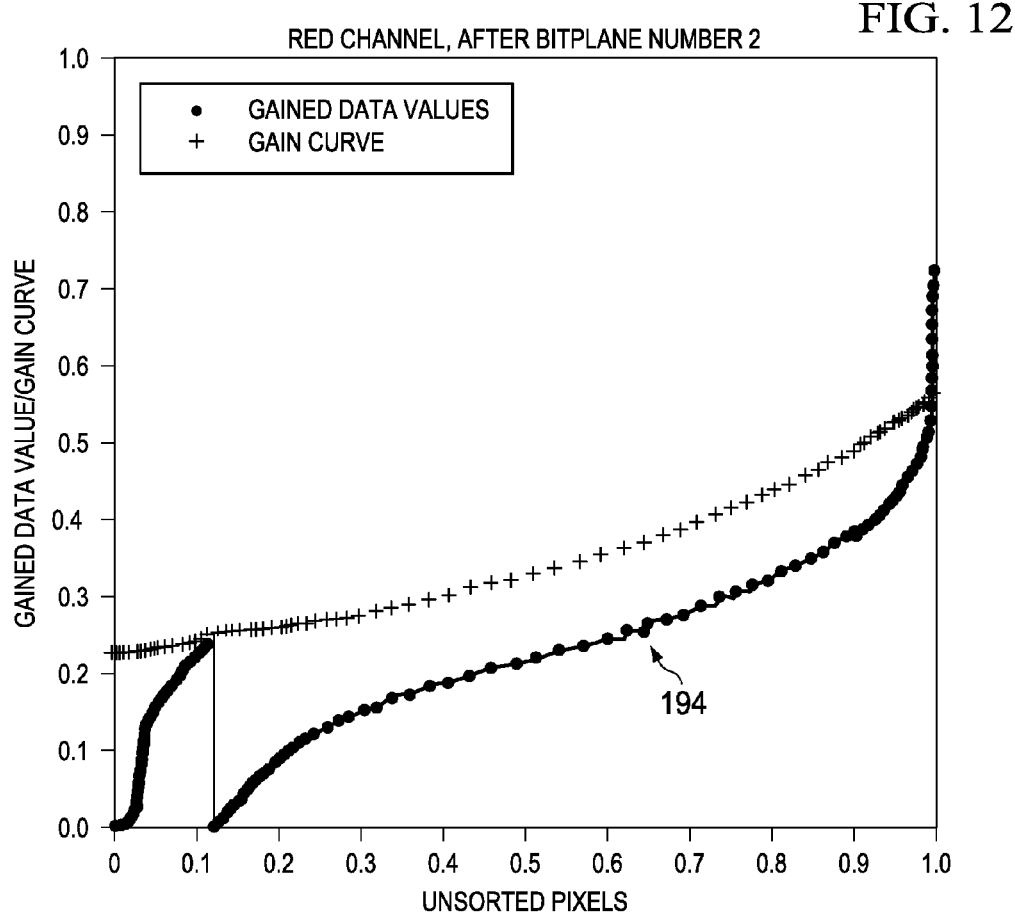

Referring to FIG. 11, curves 186 and 188 are the re-sorted calibrated-bitplane data curve after the adjustment (as shown in FIG. 10) and the gain curve (weight curve) of the second bitplane to be calculated. The intersection of the two curves defines an upper-threshold, as well as region 192, for the second bitplane. Image pixels in region 192 are set to the ON-state for the second bitplane such that all image pixels in region 192 have calibrated pixel data (after the adjustment) equal to or larger than the upper-threshold. After calculation of the second bitplane, the pixel data curve is re-adjusted to eliminate the energy represented by the calculated second bitplane (step 174 in FIG. 7). The adjusted pixel data curve is shown as curve 194 in FIG. 12. Calculation of the next (the third) bitplane can then be conducted in a similar way for the first and second bitplanes as discussed above. As shown in the flow chart in FIG. 7, calculation of the bitplane (step 172) and adjusting the calibrated pixel data based on the previously calculated bitplane (step 174) are repeated until the last bitplane (e.g. the LSB bitplane) is calculated (step 176). For demonstration purpose, FIG. 13 through 18 demonstrate calculation of the third bitplane through the $8^{th}$ bitplane following the calculations for the first and second bitplanes as discussed above.

Figure 13:
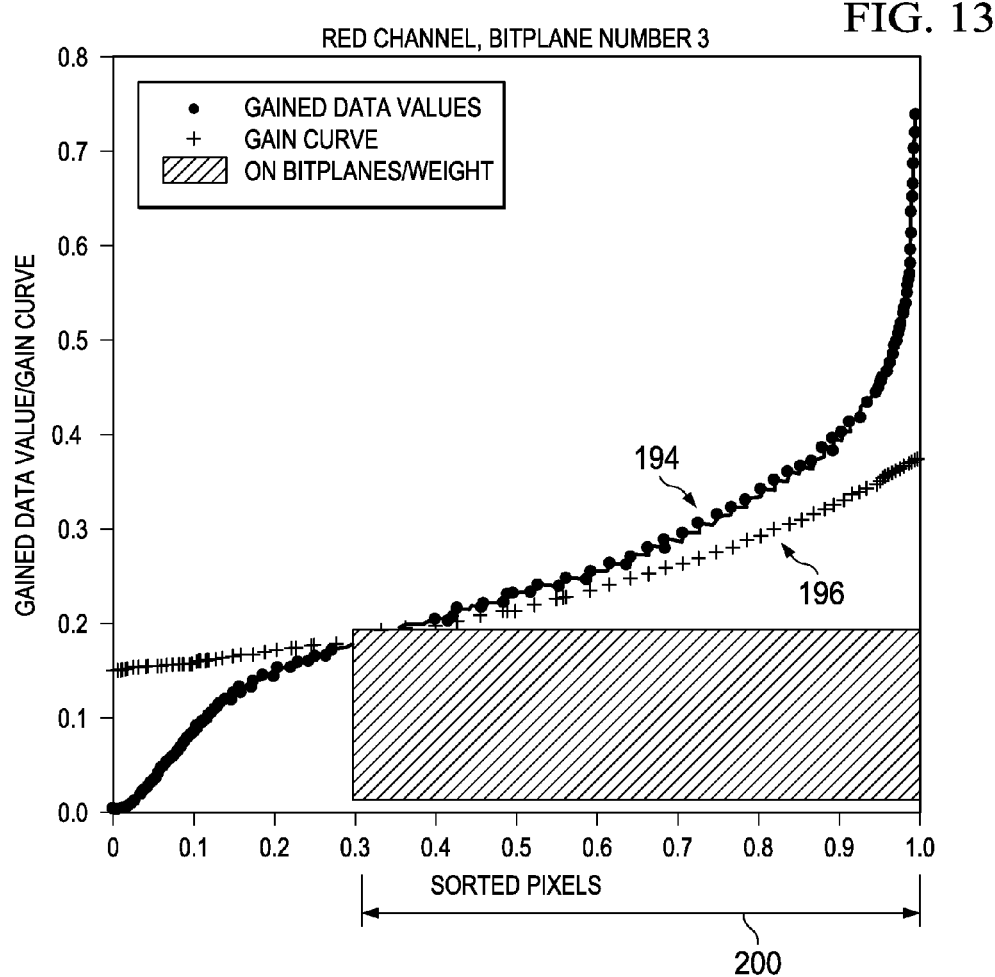
FIG. 13 through FIG. 18 show a method of consecutively calibrating the remaining bitplanes for the red color image component of the image in FIG. 21$b$.

Referring to FIG. 13, calibrated pixel data curve 194 after adjustment and re-sorting intersects with gain curve 196; and the intersection defines an upper-threshold and region 200 for the third bitplane. All image pixels in region 200 are set to the ON-state such that all pixels in region 200 have calibrated pixel data after the adjustment that are equal to or larger than the upper-threshold. The calibrated pixel data curve is then adjusted to eliminate the energy represented by the above determined third bitplane. The adjusted pixel data after re-sorting is shown in curve 204 in FIG. 14. Calculation of the next (fourth) bitplane can then be performed.

Figure 14:
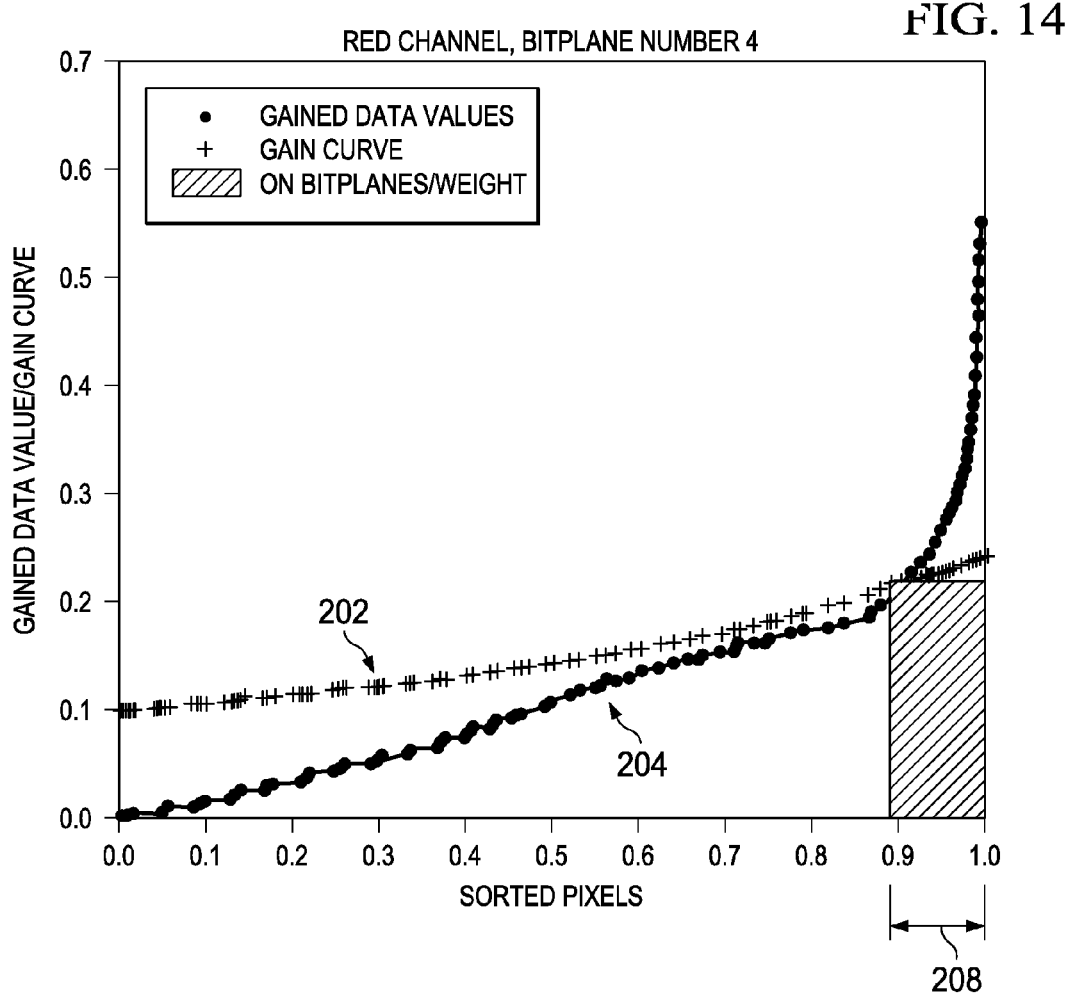

Referring to FIG. 14, pixel data curve 204 and weight curve 202 of the fourth bitplane have an intersection; and the calibrated pixel data value of such intersection can be defined as a threshold for the fourth bitplane. All image pixels of the fourth bitplane in region 208 are set to the ON-state such that all pixels in region 208 have calibrated pixel data after the adjustment that are equal to or larger than the upper-threshold. The calibrated pixel data curve is then adjusted to eliminate the energy represented by the above determined fourth bitplane. The adjusted pixel data after re-sorting is shown in curve 210 in FIG. 15. Calculation of the next (fifth) bitplane can then be performed, as demonstrated in FIG. 15.

Figure 15:
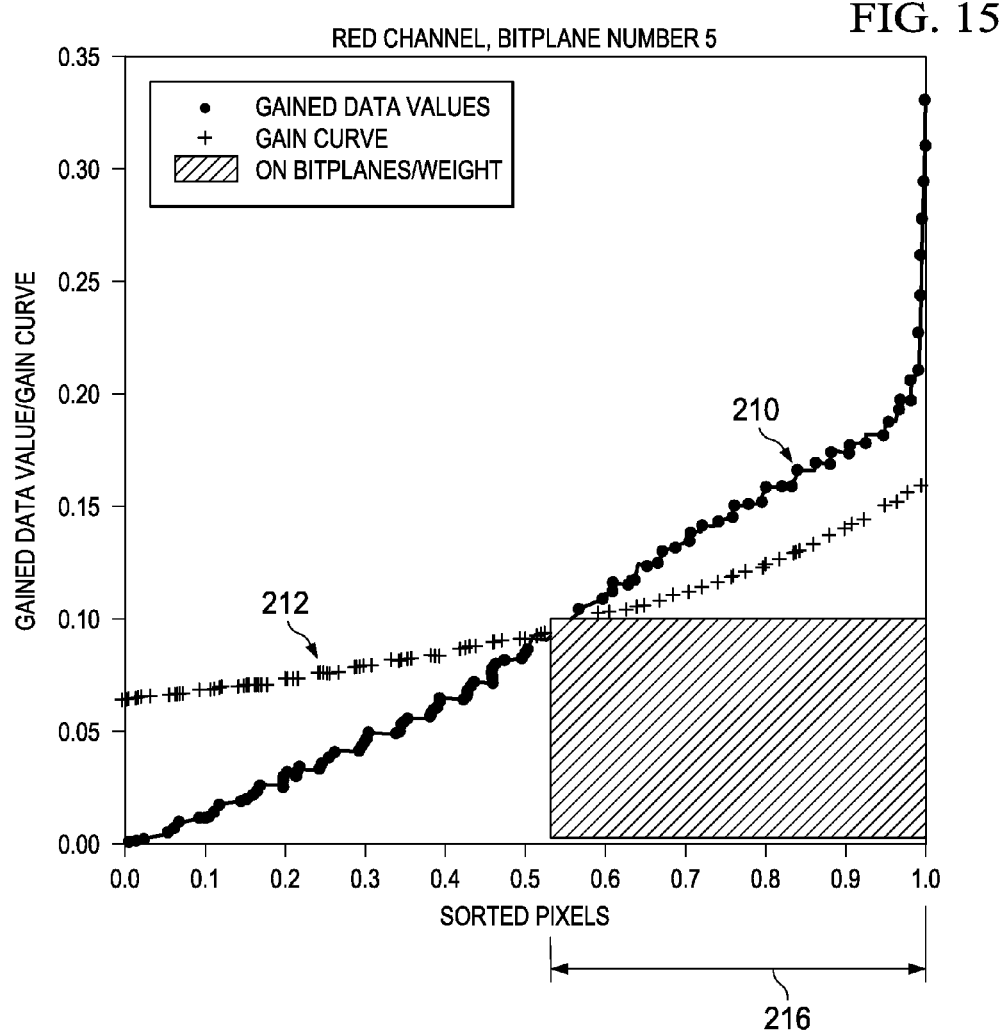

Referring to FIG. 15, pixel data curve 210 and weight curve 212 of the fifth bitplane have an intersection; and the calibrated pixel data value of such intersection can be defined as a threshold for the fifth bitplane. All image pixels of the fifth bitplane in region 216 having calibrated pixel data after the adjustment equal to or larger than the upper-threshold are set to the ON-state. The calibrated pixel data curve is then adjusted to eliminate the energy represented by the above determined fifth bitplane. The adjusted pixel data after re-sorting is shown in curve 218 in FIG. 16. Calculation of the next (sixth) bitplane can then be performed, as demonstrated in FIG. 16.

Figure 16:
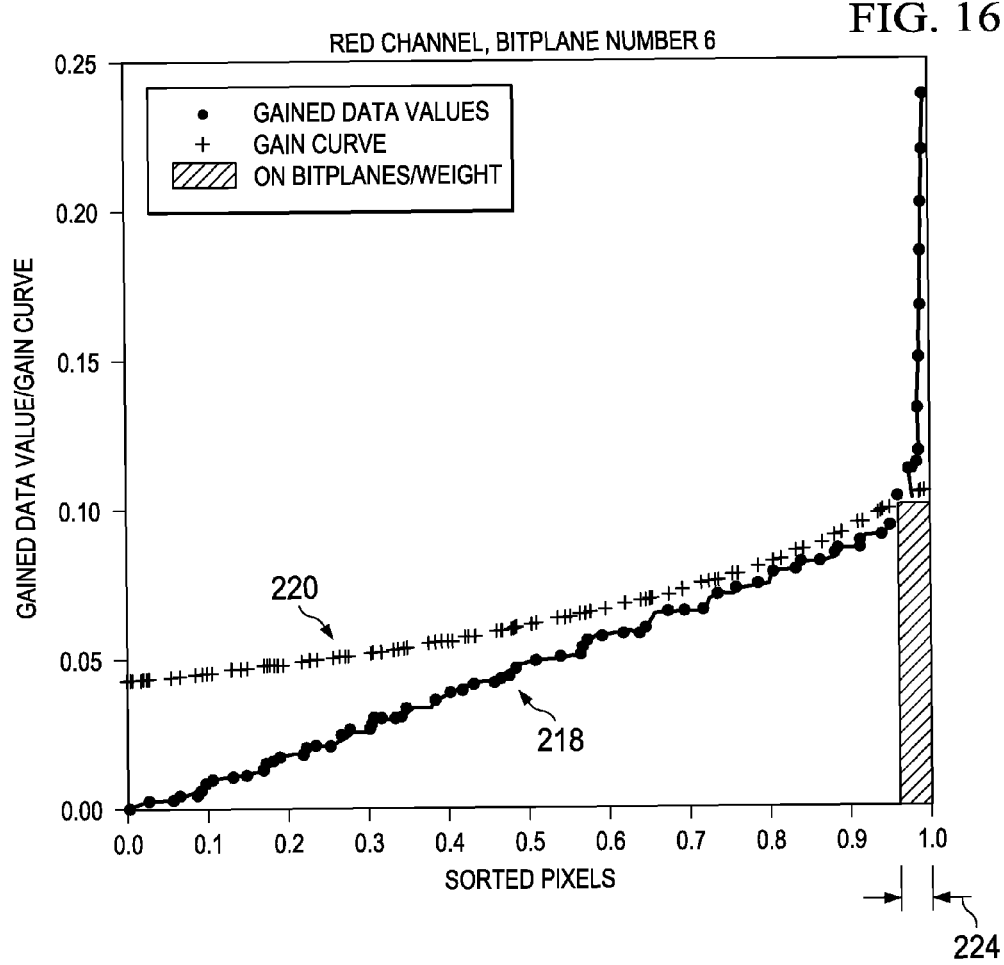

Referring to FIG. 16, pixel data curve 218 and weight curve 220 of the sixth bitplane have an intersection; and the calibrated pixel data value of such intersection can be defined as a threshold for the sixth bitplane. All image pixels of the sixth bitplane in region 224 having calibrated pixel data after the adjustment equal to or larger than the upper-threshold are set to the ON-state. The calibrated pixel data curve is then adjusted to eliminate the energy represented by the above determined sixth bitplane. The adjusted pixel data after re-sorting is shown in curve 226 in FIG. 17. Calculation of the next (seventh) bitplane can then be performed, as demonstrated in FIG. 17.

Figure 17:
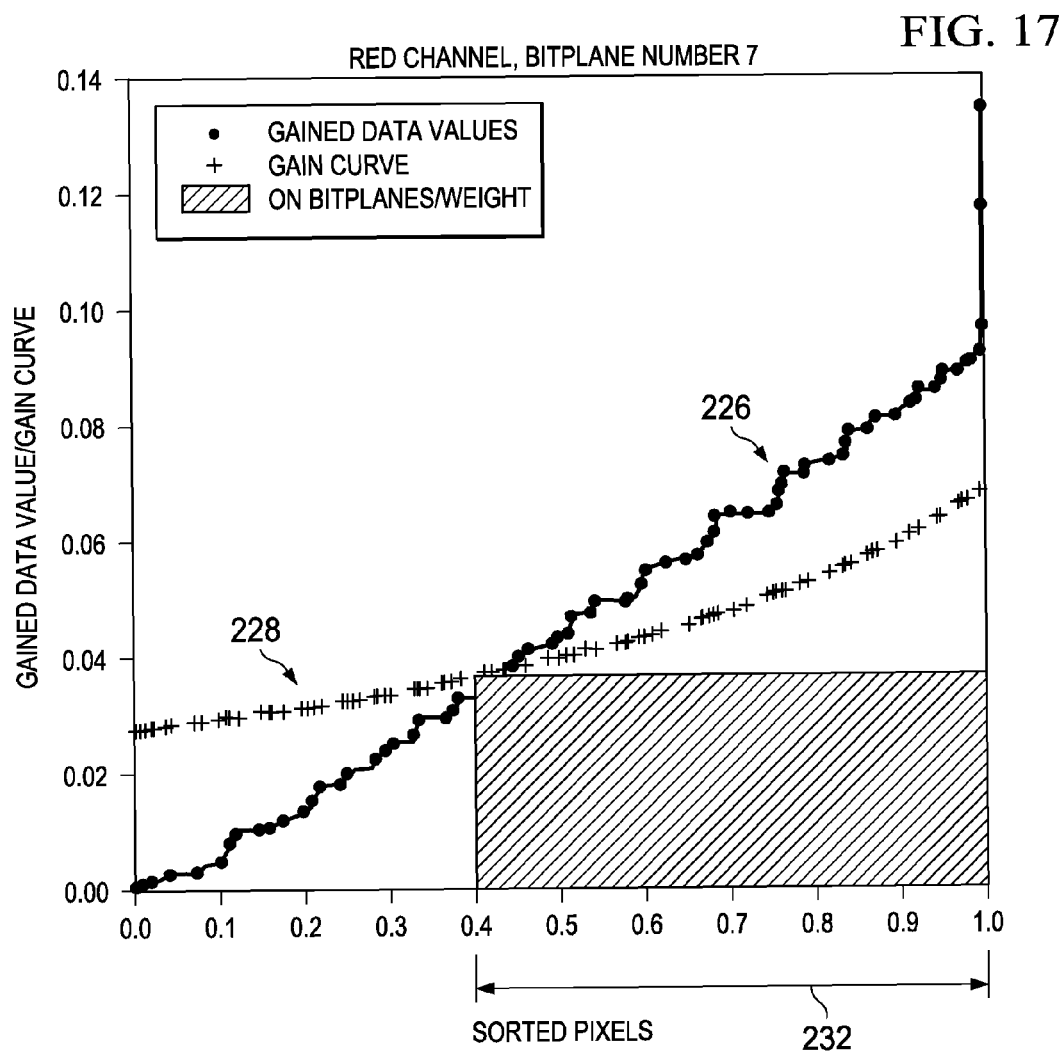

Referring to FIG. 17, pixel data curve 226 and weight curve 228 of the seventh bitplane have an intersection; and the calibrated pixel data value of such intersection can be defined as a threshold for the seventh bitplane. All image pixels of the seventh bitplane in region 232 having calibrated pixel data after the adjustment equal to or larger than the upper-threshold are set to the ON-state. The seventh bitplane can then be obtained by converting the adjusted pixel data. The calibrated pixel data curve is then adjusted to eliminate the energy represented by the above determined seventh bitplane. The adjusted pixel data after re-sorting is shown in curve 234 in FIG. 18. Calculation of the next (eighth) bitplane can then be performed, as demonstrated in FIG. 18.

Figure 18:
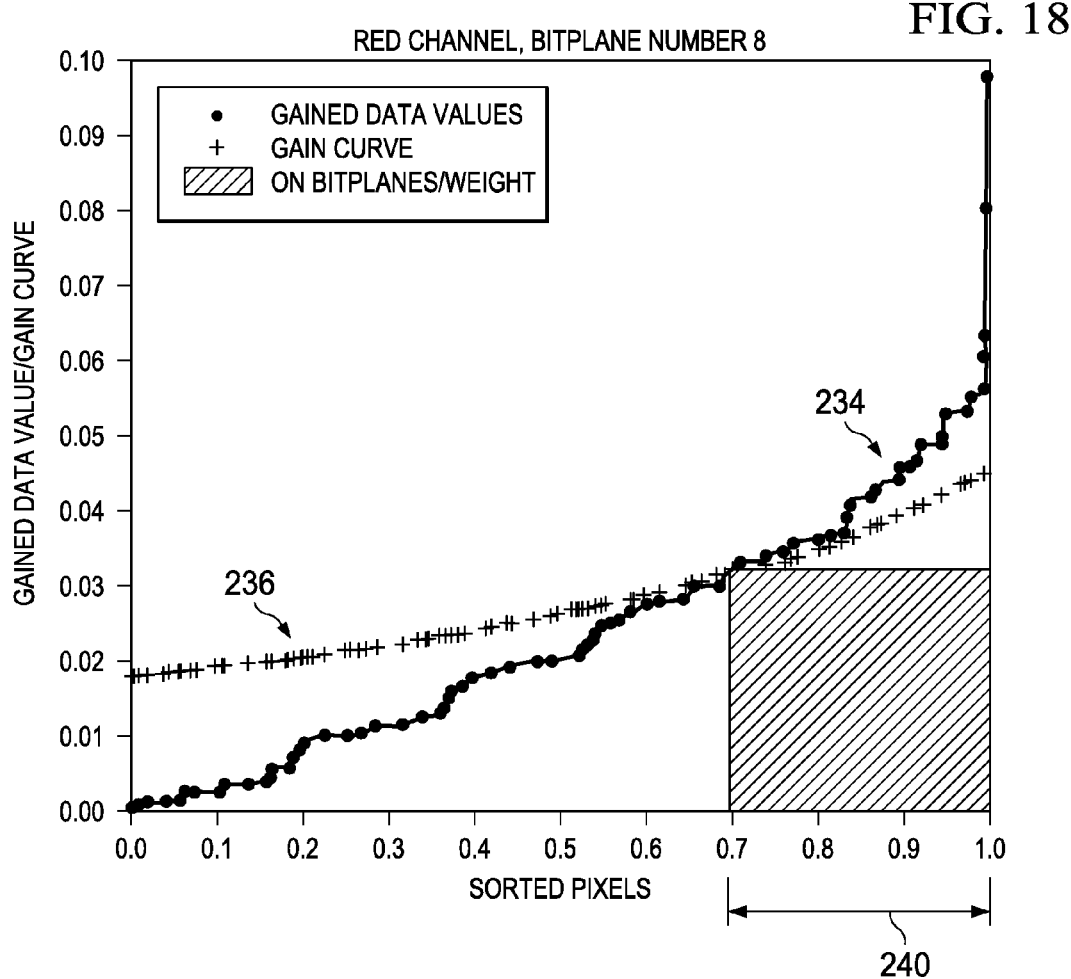

Referring to FIG. 18, pixel data curve 234 and weight curve 236 of the eighth bitplane have an intersection; and the calibrated pixel data value of such intersection can be defined as a threshold for the eighth bitplane. All image pixels of the eighth bitplane in region 240 having calibrated pixel data after the adjustment equal to or larger than the upper-threshold are set to the ON-state. The eighth bitplane can then be obtained by converting the adjusted pixel data.

Figure 19:
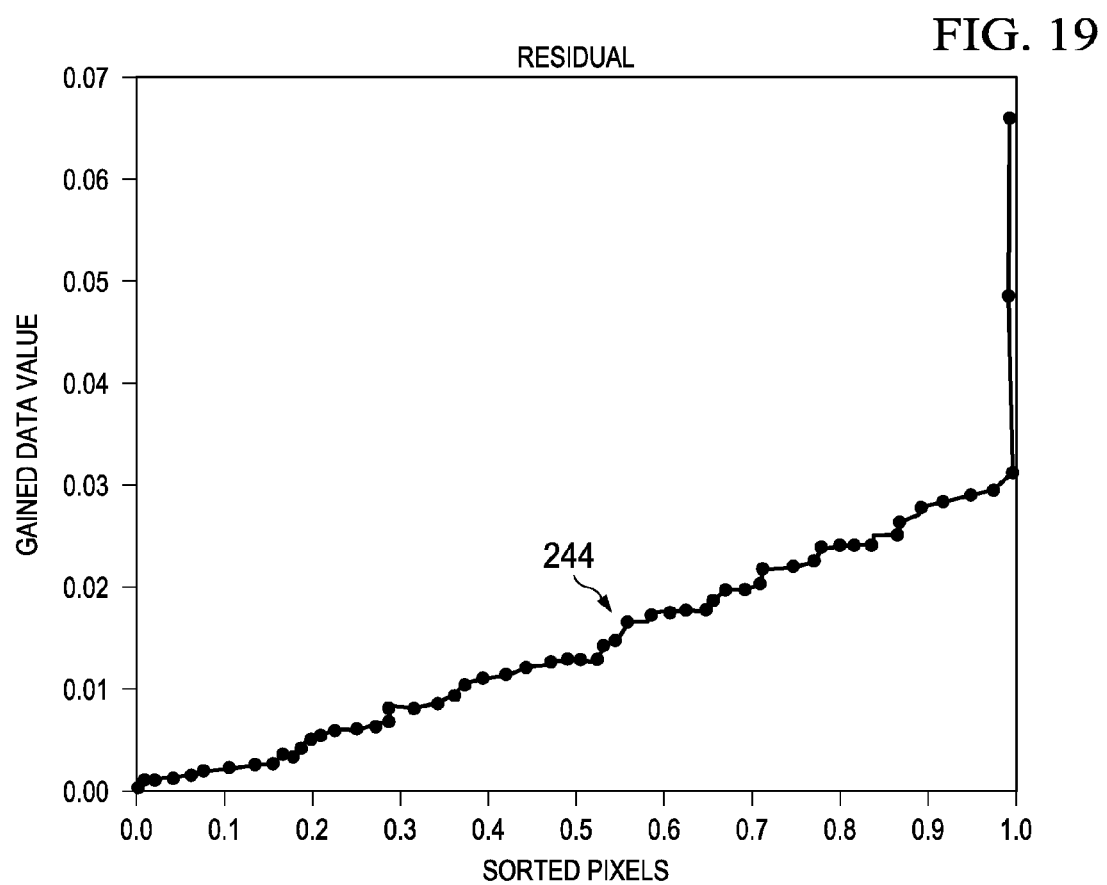
FIG. 19 and FIG. 20 show an exemplary method of presenting residual energies in the pixel data.

After calibrating all bitplanes (e.g. the above eight bitplanes as an example), the calibrated pixel data may have a residual value (energy) that are not represented by the combination of the previously calibrated bitplanes, as shown in curve 244 FIG. 19. This residual energy can be calculated in step 156 in the flow chart of FIG. 5 by subtracting the energy carried by the eighth bitplane from the calibrated pixel data curve (134) shown in FIG. 18.

To present this residual energy (step 158 in the flow chart in FIG. 5), a spatial-temporal-multiplexing (STM) technique, such as that set forth in U.S. Pat. No. 7,075,506 to Morgan, issued Jul. 11, 2006, the subject matter being incorporated herein by reference in its entirety, can be employed. Specifically the STM technique generates a bitplane by probabilistically setting each pixel to either the ON or OFF state depending upon the pixel data values, the STM mask, and the STM bit weight that is further determined based on the number of pixels being turned on. An example of such generated STM bitplane is demonstrated in curve 242 as shown in FIG. 20.

Figure 20:
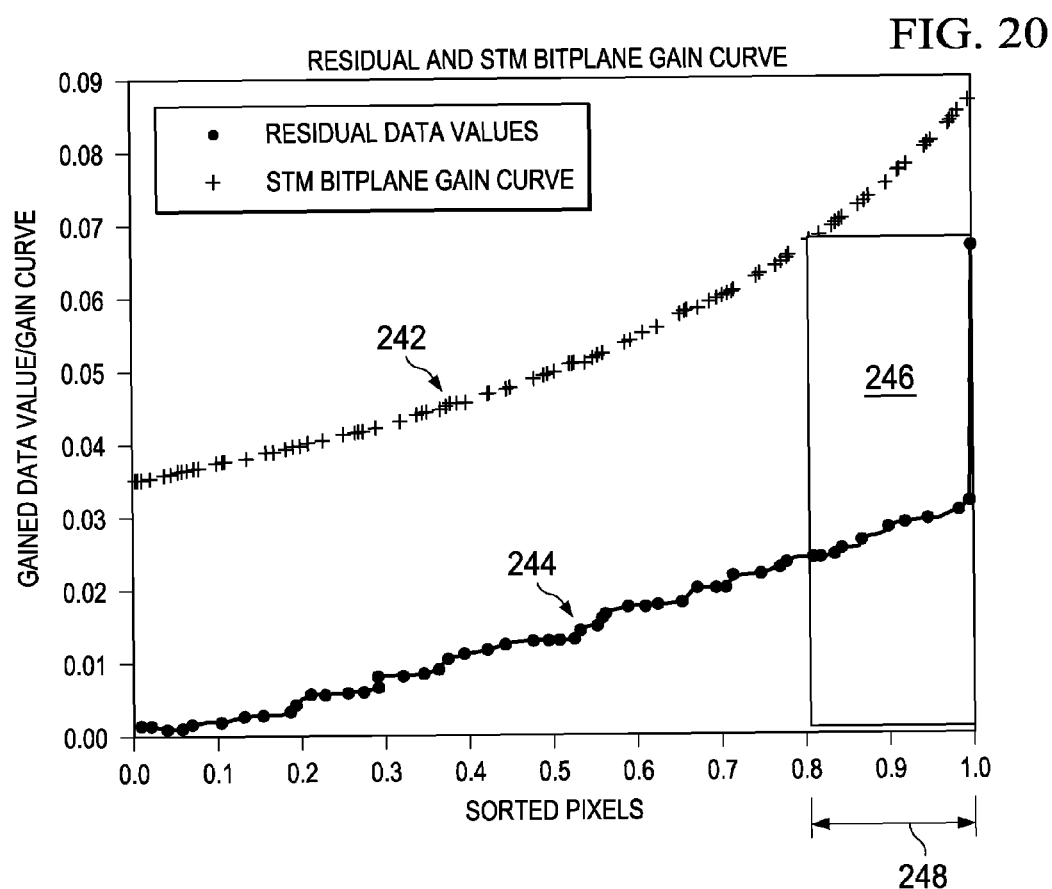

Referring to FIG. 20, the weight of the STM bitplane (242) is chosen such that the total light intensity of the STM bitplane, which is represented by the area of block 246, is substantially equal to the area encompassed by the residual biplane data curve 244 and the horizontal axis with such area representing the energy of the residual calibrated pixel data. The height of block 246 is then used as the STM bit weight, and pixels of the STM bitplane are probabilistically set to either ON or OFF state depending on the pixel data values, the STM mask, and this calculated STM bit weight.

Till this point, bitplanes including the calibrated bitplanes and the STM bitplanes have been obtained. These bitplanes are capable of representing both the intensity of the bitplanes derived from the desired image and the intensity of the recycled off-state light. Presenting these bitplanes in the pixels of the spatial light modulator of the display system can eliminate the intensity variation problem as discussed above.

The above discussed bitplane derivation is only one of many possible ways. In another example, bitplane thresholds values (or equivalently the input pixel code levels corresponding to the bitplane threshold values) for all bitplanes (e.g. from the MSB bitplane to the LSB bitplane) can be calculated using the above discussed method. The calculated thresholds are stored, for example in a column of a table with each threshold being in a cell of the column. Pixel data of all pixels of the image are then compared to the stored thresholds; and values of individual pixels in each bitplane are determined based on the comparison. Taking the MSB bitplane as an example, pixel data of the image are compared to the calculated threshold for the MSB bitplane. Pixels of the image having the pixel data values equal to or higher than the threshold for the MSB bitplane are identified through the comparison. The MSB bits of such identified pixels of the image are set to the ON-state value, such as "1;" and the MSB bits of other pixels (having image values lower than the threshold for the MSB) are set to the OFF-state value, such as "0." Bit values of other pixel data can be determined in the same way using their corresponding thresholds. The adjusted pixel data can then be converted to corresponding bitplanes using many ways, such as those set forth in U.S. Pat. No. 7,075,506 to Morgan, issued Jul. 11, 2006, U.S. Pat. No. 5,663,749 to Farris issued Sep. 2, 1997, and U.S. patent application Ser. No. 10/648,608 to Richards filed Aug. 25, 2003, the subject matter of each being incorporated herein by reference in its entirety. It will be appreciated by those of skill in the art that the point at which image pixels are converted to bitplane pixels (whether immediately following each bitplane threshold calculation or after all bitplane threshold calculations are complete) has no effect on the function or spirit of the present invention. In an example, the upper threshold is the point at which the calibrated pixel data is equal to or higher than the bit-weight given by the gain curve (180). An example of such upper threshold is the crossing point (182) of calibrated pixel data curve 179 and gain curve 180. All pixels (i.e. pixels in region 184) having the calibrated pixel data equal to or above the upper-threshold are set to the ON-state.

In another example, a look up table (LUT) can be created and used for deriving individual bitplanes with an exemplary LUT being shown in TABLE 1. For demonstration purposes, table 1 assumes that the input image has 256 pixel levels and n bitplanes are to be derived for the image. Different pixel data levels for each color image component are in rows of the table 1; while the bits from MSB to LSB of the bitplanes are in columns of the table. The value in each cell indicates the ON ("1") or OFF-state ("0"). This table can be generated through following steps.

After determining the thresholds for each bitplane (of each color image component) as discussed above with reference to FIG. 8 through FIG. 20, the most possible values of pixel data levels (from 0 to 255 when the input image has 256 levels) for each bitplane can be determined based on the pixel data value of the threshold (Y coordinate of the threshold). As an example wherein the threshold for the MSB is determined as shown in FIG. 9, the threshold is determined at cross-point 182. The Y coordinate (gained pixel data values) splits the pixel data (for the MSB) bitplane into two sections—the first section having pixel data equal to or higher than the Y coordinate; and the second section having pixel data lower than the Y coordinate. The MSB bits corresponding to all pixels in the first section are set to the ON-state value ("1"); and the MSB bits corresponding to all pixels in the second section are set to the OFF-state value ("0"). For example, assuming the Y coordinate of point 182 in FIG. 9 is 0.84, which corresponds to 117.6 in the [0, 255] image data levels, then the most probable level $L_p$ can be set to 117 or 118, or other approximate integer levels. Assuming the most probable level is 117, all bits in the MSB for the pixels having pixel data levels below 117 (i.e. levels from 0 to 116) are set to the OFF-state value ("0"); while all bits in the MSB for the pixels having pixel data levels equal to or higher than 117 (i.e. levels from 117 to 255) are set to the ON-state value ("1"), resulting in the values in the MSB column. Other bit planes values can be calculated in the same way with their individual thresholds being calculated using the method as discussed above with reference to FIG. 8 to FIG. 20. Therefore, it can be seen that table 1 includes the effect of the recycled off-state light; and can thus be different from frame to frame due to different off-state light being recycled. The bitplanes can be determined using the LUT shown in table 1, as discussed in the following.

For a given pixel with a value from 0 to n, its corresponding bitplane bit values can be immediately determined from the LUT, as shown in TABLE 1. For example, assuming the red channel pixel value of the $i^{th}$ pixel in the incoming image is 3, then the red MSB bit for the $i^{th}$ pixel is 0; and the bits of the third red bitplane and the red LSB of the $i^{th}$ pixel are 1. In another example, assuming the red channel pixel value of the $p^{th}$ pixel in the incoming image is 255, then bits of all bitplanes from the red MSB to LSB are 1 according to the exemplary table 1. As such, bitplanes can be determined for all pixel values of the incoming image based on the LUT. It is noted that the above discussion, especially table 1, is for demonstration purpose only; and table 1 is only an example. The values of bitplanes in table 1 can be different for different images or image frames of video(s). The layout of the LUT, for example, the numbers of columns and rows and their arrangements in rows and columns, can be changed. For example, the data values can be plot in the columns; while the bits of the same bitplane can be plotted in rows. Input data values may or may not be plotted sequentially in ascending or descending orders; and can alternatively be in any orders, even randomly, so as the bits of the bitplanes in the table.

TABLE 1

| | Input Data Values | Bitplane ON/OFF | | | | | | Residual (float) |
|---|---|---|---|---|---|---|---|---|
| | | MSB 1 | 2 | 3 | ... | ... | LSB n | |
| Red | 0 | 0 (off) | 0 | 0 | 0 | 0 | 0 | |
| | 1 | 0 | 0 | 0 | 0 | 1 | 0 | |
| | 2 | 0 | 0 | 1 | 0 | 1 | 0 | |
| | 3 | 0 | 0 | 1 | 0 | 1 | 1 | |
| | ... | 0 | 1 | 1 | 0 | 1 | 1 | |
| | ... | ... | ... | ... | ... | ... | ... | |
| | 255 | 1 (on) | 1 | 1 | 1 | 1 | 1 | |
| Green | 0 | 0 | 0 | 0 | 0 | | | |
| | 1 | 0 | 0 | 1 | 0 | | | |
| | 2 | 1 | 0 | 1 | 0 | | | |
| | 3 | 1 | 0 | 1 | 1 | | | |
| | ... | 1 | 0 | 1 | 1 | | | |
| | ... | ... | ... | ... | ... | | | |
| | 255 | 1 | 0 | 1 | 1 | | | |
| Blue | 0 | | | | | | | |
| | 1 | | | | | | | |
| | 2 | | | | | | | |
| | 3 | | | | | | | |
| | ... | | | | | | | |
| | ... | ... | ... | ... | ... | ... | ... | |
| | 255 | | | | | | | |

For demonstration purpose, a pseudo-code for deriving bitplanes based on the thresholds and a LUT is presented in appendix A.

In the above, derivation of the set of bitplanes from a specific color image component of the desired image and determination of a S™ bitplane have been accomplished. These processes can be repeated for all other image color components of the desired image.

Figure 21A:
FIG. 21$a$ and FIG. 21$b$ show exemplary images with and without the brightness boost, wherein the image having the brightness boost is presented by the pulse-width-modulation algorithm as illustrated in the flow chart of FIG. 5.
Figure 21B:

As an example, FIG. 21a and FIG. 21b show two pictures to demonstrate the effect of the brightness boost. Specifically, the picture in FIG. 21a is produced by a display system with substantially zero off-state recycling efficiency. The picture in FIG. 21b is produced by the same display system with non-zero off-state recycling efficiency and the bitplanes derived as discussed above.

Another Pulse-Width-Modulation Algorithm

As discussed above, because different bitplanes (either having or not having the same significance) can cause different numbers of on-state and off-state pixels of the spatial light modulator, the amount of recycled off-state light varies over bitplanes for a given off-state light recycling mechanism. Such variation in turn causes unwanted illumination intensity changes on the screen in reproducing the desired image. As a consequence, the bitplanes derived from the desired image when displayed by the pixels of the spatial light modulator do not result in the desired image on the screen. This problem can alternatively be solved by displaying the bitplanes at different clock speeds depending upon the number of off-states (or on-states) in the bitplanes. Specifically, bitplanes having different numbers of off-state pixels therein are displayed at different clock speeds in the spatial light modulator such that bitplanes having different number of off-state pixels (resulting in different amounts of recycled off-state light) can be displayed for different time periods so as to compensate for the illumination intensity variations due to the off-state light recycling. This bitplane displaying algorithm can result in that bitplanes of different image frames in a video content composed of image frames may be displayed for different time periods, even for the bitplanes with the same significance.

Figure 22A:
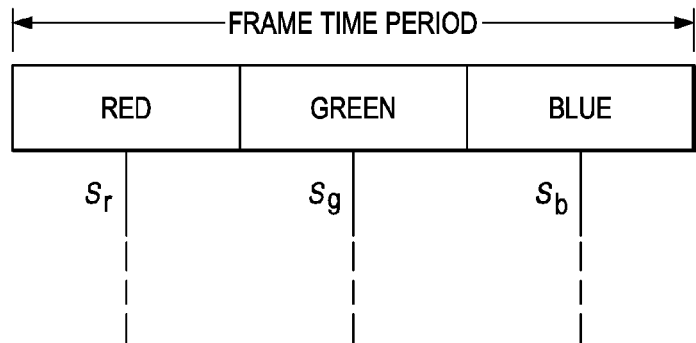
FIG. 22 schematically illustrates a method for adjusting a sequence of color duty cycles so as to display bitplanes at adjusted clock speeds in the presence of off-state light recycling.
Figure 22B:
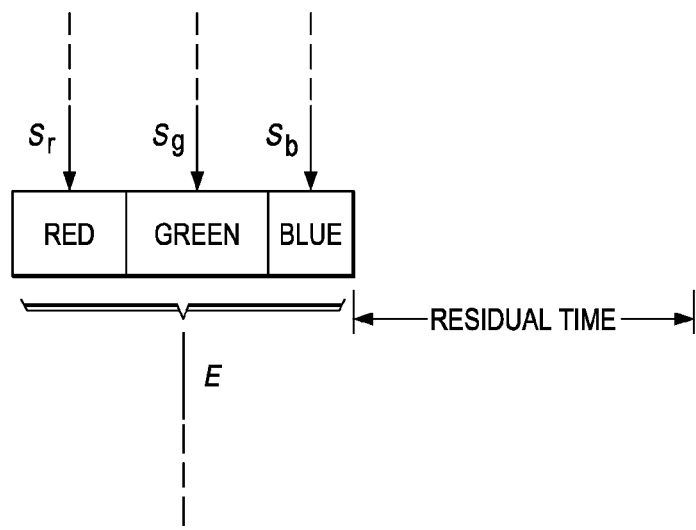
Figure 22C:
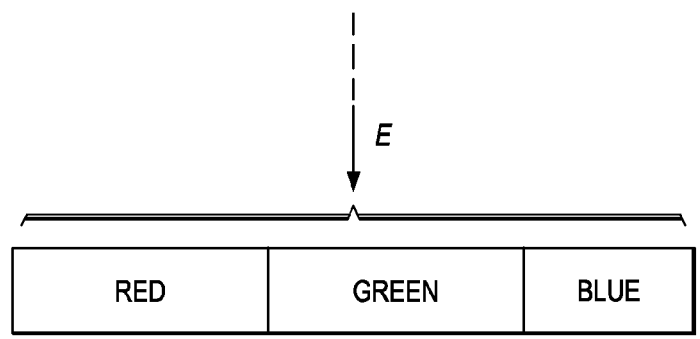

As a way of example, FIG. 22a through FIG. 22c schematically illustrate a method for displaying bitplanes at different clock speeds depending upon the number of off-states (or on-states) in the bitplanes.

Referring to FIG. 22a, an exemplary sequence of color duty cycles within a frame time period is schematically illustrated therein. In this example, the sequence of color duty cycles comprises red, green, and blue colors with each color being allotted a display time such that the total display time of all colors is substantially equal to the frame time period. For example, the red, green, and blue colors can respectively be 33%, 32%, and 35% of the entire frame time. Each color duty cycle time is scaled down by a scaling factor that is determined based on the gain due to off-state light recycling in displaying the corresponding color channel, as illustrated in FIG. 22b. Specifically, the red, green, and blue color duty cycle time periods are respectively scaled down by scaling factors $S_r$, $S_g$, and $S_b$. The scaling factors $S_r$, $S_g$, and $S_b$ are determined based on the gains $g_{red}$, $g_{green}$, and $g_{blue}$ that are calculated using equation 4 as discussed above. In one example, the scaling factors can be set to the corresponding gains, that is, $S_r = g_{ref}$; $S_g = g_{green}$; and $S_b = g_{blue}$. In another example, the scaling factors can be proportional to the gains, which can be expressed as: $S_r = a \times g_{red}$; $S_g = a \times g_{green}$; and $S_b = a \times g_{blue}$, wherein a can be a value that is less or greater than 1 but the resulted scaling factors are larger than 1.

After scaling, the sequence of color duty cycles is compressed, resulting in a residual time period in the frame time period as shown in FIG. 22b. The compressed sequence of color duty cycles in FIG. 22b is then uniformly stretched out by a stretching factor E so as to fit the entire frame time period as illustrated in FIG. 22c. The stretching factor E can be calculated using the following equation 7.

$$E = \epsilon(\Sigma t_i A_i) + (1-\epsilon) \qquad (\text{Eq. 7})$$

In equation 7, $t_i$ is the proportion of the time allotted to each color image component of the desired image (or image frame). Specifically, $t_i$ is defined as $T_i/T_{frame}$, wherein $T_i$ is the time allotted to the $i^{th}$ color image component (e.g. red color image component); and $T_{frame}$ is the frame time. Accordingly, $\Sigma t_i = 1$. $A_i$ is the average pixel value of the $i^{th}$ color image component in linear light space after de-gamma has been applied. $\Sigma(t_i A_i)$ represents the average total number of on-state pixels in the image during the frame period $T_{frame}$.

In display applications, compression of the color duty sequence as illustrated in FIG. 22b can be achieved by designing the pulse-width-modulation sequence. A PWM sequence is referred to as a process of displaying the bitplanes derived from the image based on the PWM by the pixels of the spatial light modulator. In an example wherein displaying the bitplanes is accomplished through multiple steps, such as loading the bitplanes into the pixels of the spatial light modulator and resetting the pixels to states corresponding to the loaded bitplanes, the PWM sequence is referred to the process having the steps of loading the bitplanes and resetting the pixels of the spatial light modulators. Stretching the color duty cycles as illustrated in FIG. 22c can be accomplished through adjusting the clock speed of the spatial light modulator of the display system, which will be detailed in the following. It is noted that FIG. 22a through FIG. 22c are for demonstration purpose wherein the color duty cycle comprises red, green, and blue colors. In general, the color duty cycle may comprise any combinations of colors that are preferably, tough not required, selected from red, green, blue, yellow, cyan, magenta, and white.

Figure 23:
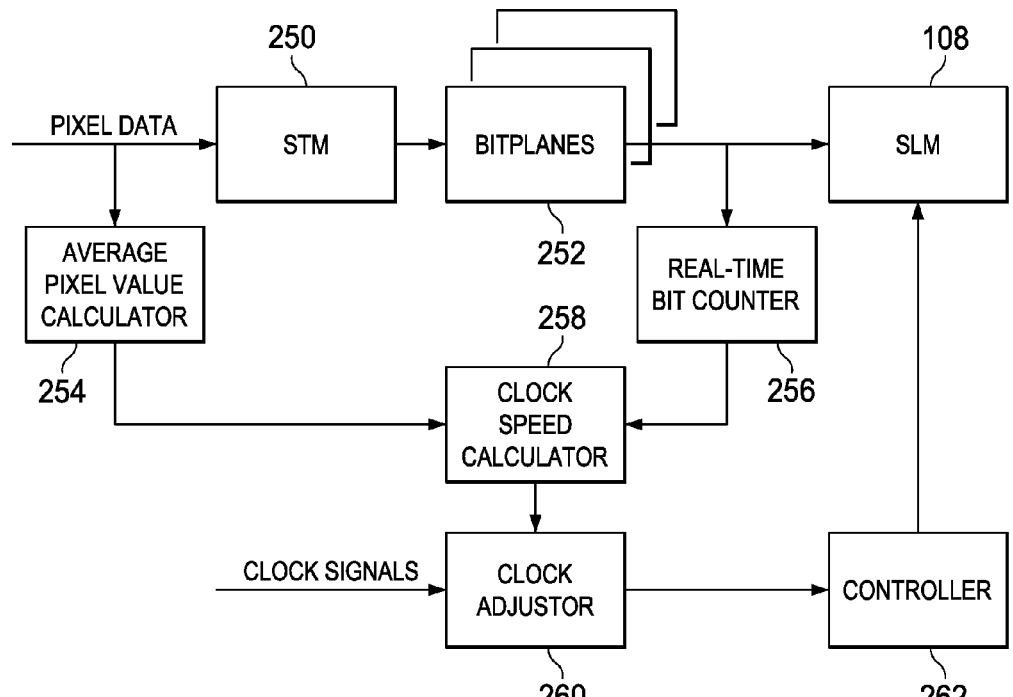
FIG. 23 demonstrates an exemplary system and method for displaying bitplanes with dynamically adjusted clock speed in the presence of off-state light recycling.

As an example, FIG. 23 is a diagram schematically illustrating an exemplary operation for displaying bitplanes at different clock speeds. Referring to FIG. 23, pixel data of a desired image is received by data formatter 250, which can be a spatial-temporal-multiplexing unit (STM), for formatting the received pixel data into bitplanes 252. An exemplary data formatter is set forth in U.S. Pat. No. 7,075,506 to Morgan, issued Jul. 11, 2006, the subject matter being incorporated herein by reference in its entirety. Other data formatting algorithms and technologies that convert image pixel data to bit-plane data (or bitplanes) are also applicable. The pixel data can be in any desired formats, such as RGB data, CYM data, and YPbPr data. The formatted bitplanes can also be in any desired formats, such binary formats and non-binary-formats. When the input image is a color image having different color image components, a set of bitplanes is derived from each color image component. The derived bitplanes of the image are delivered to pixels of spatial light modulator 108; and the states (e.g. the ON and OFF-state for binary pixels) of the pixels are then set based on the values of the individual pixels in the delivered bitplanes.

In general, a display system has at least one clock that generates clock signals based on which operations of the functional members including pixels of the spatial light modulator of the display system can be synchronized; or operations of a functional member of the display system can be triggered. Accordingly, durations of the bitplanes in the pixels of the spatial light modulator can be varied by changing the clock speed. As a way of example wherein a bitplane is to be displayed for 4 time units at the first clock speed according its weight (significance), such bitplane however can be actually displayed for 8 time units at the second clock speed that is half the first clock speed; and can be displayed for 2 time units at the third clock speed that is twice the first clock speed.

For displaying bitplanes at different clock speeds while within a frame period, a pulse-width-modulation (PWM) sequence is designed such that the sequence can run in a time period T of $T_{frame} \times I_o/I_{max}$, which is shorter than the frame time $T_{frame}$, such as 1/(60 HZ); wherein $I_o$ is the intensity defined in equation 1; and $I_{max}$ is the maximum value of I as described in equation 1. In an example wherein the recycling efficiency $\epsilon$ is ⅔, $I_{max}$ is $3I_o$; and the time period T for the PWM sequence can be 16667/3=5556 microseconds.

With the PWM sequence time that is shorter than the frame time, bitplanes can be displayed at different clock speeds without exceeding the frame time, wherein the clock speeds can be dynamically adjusted based on the number of off-state pixels in the bitplanes. As a way of example, the display time for each bitplane can be determined by equation 8 as expressed in the following:

$$C = \frac{C_o E}{1 - \varepsilon \frac{n_{off}}{N_{total}}} \quad \text{(Eq. 8)}$$

In equation 8, C is the adjusted clock speed; $C_o$ is the clock speed provided by the display system to the spatial light modulator; $n_{off}$ is number of off-state pixels in the bitplane or bitplanes (when multiple bitplanes are displayed at a time) being displayed by the pixels of the spatial light modulator; $N_{total}$ is the total number of pixels in the bitplane or bitplanes being displayed; $\epsilon$ is the recycling efficiency; and E is the time-stretch factor, which can be calculated by the above equation 7.

It can be observed from equation 8 that clock speed C is larger for bitplanes with more off-state pixels than for bitplanes with fewer number of off-state pixels. As a consequence, a first bitplane in one image frame may be displayed for a shorter time period than a second bitplane in another image frame when the first bitplane has more off-state pixels than the second bitplane even though the first and second bitplanes have the same weight (significance).

Calculating the clock speed and operating the spatial light modulator at the calculated clock speed can be accomplished in many ways, one of which is schematically illustrated in FIG. 23. As shown in FIG. 23, average pixel value calculator 254 is input pixel data of incoming images for calculating the average pixel value $A_i$ for each color image component of the input image; and forwarding the calculated $A_i$ to clock speed calculator 258. Before calculating the adjusted clock speed for the spatial light modulator, the number of off-state pixels in each bitplane is calculated by real-time bit-counter 256. As a way of example wherein the PWM sequence comprises a step of loading the bitplanes into pixels of the spatial light modulator and a step of resetting the pixels to states corresponding to the loaded bitplanes, the pixels of the spatial light modulator are divided into a multiple reset groups. A set of groups of bitplanes is derived from the desired image with each bitplane corresponding to a reset group. The bitplanes are loaded to the pixels of the spatial light modulator in reset groups; and the pixels are reset according to the loaded bitplanes. For demonstration purpose, FIG. 24 schematically illustrates an array of pixels of a spatial light modulator with the pixels in the array being divided into reset groups.

Figure 24:
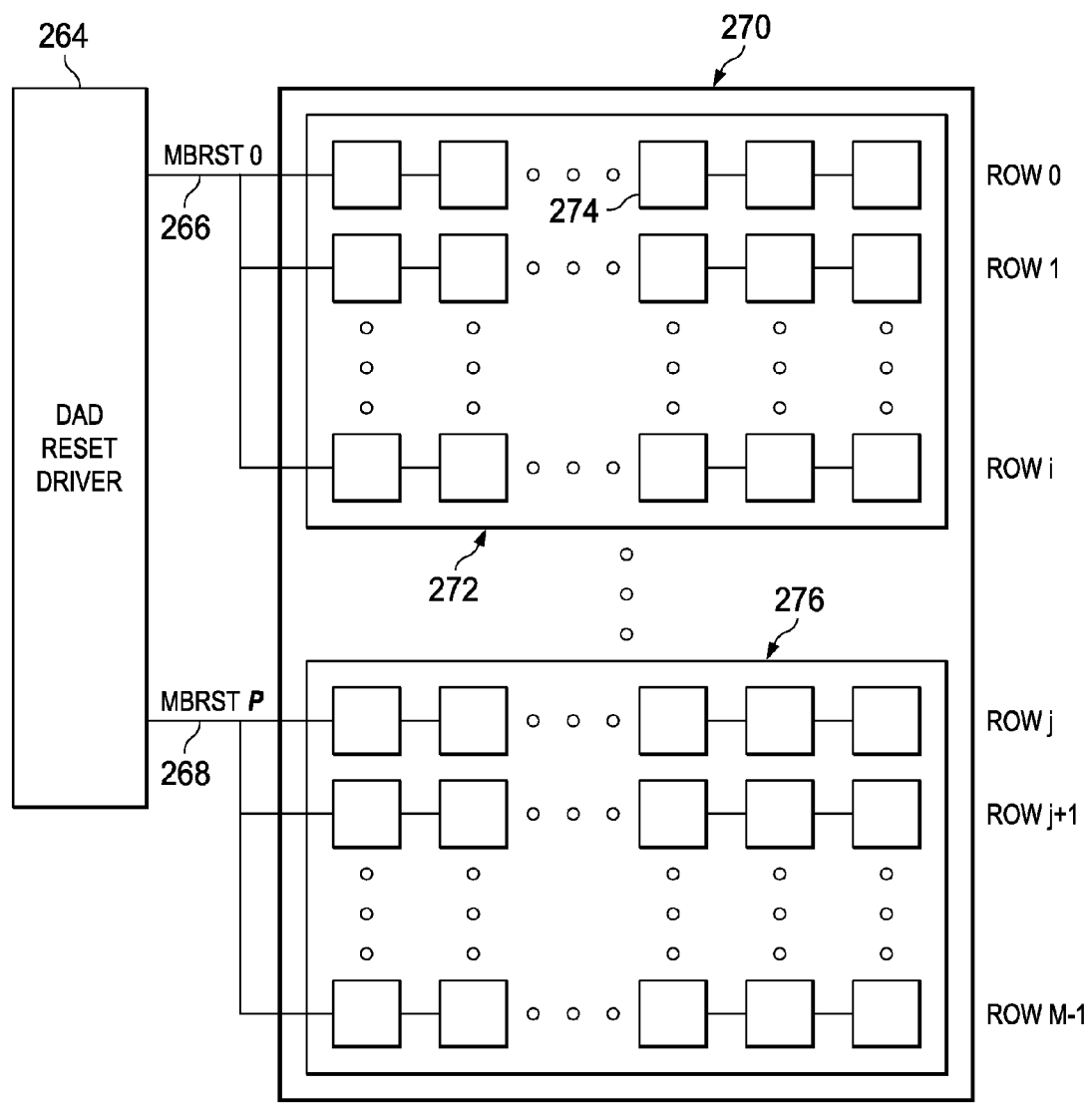

Referring to FIG. 24, pixel array 270 of a spatial light modulator, such as spatial light modulator 108 in FIG. 1, comprises an array of individually addressable pixels (e.g. pixel 274) that can be micromirrors, liquid-crystal-on-silicon, and other types of devices. The pixels are connected to a set of reset lines, such as reset lines MBRST 0 266 through MBRST P 268, through each of which reset signals can be delivered to the pixels. Upon receipt of the reset signals, the pixels are set to desired states. In this example, the entire pixel array is divided into multiple reset groups (e.g. reset groups 272 and 276); and each group is connected to a reset line. For example, pixels of reset group 272 are connected to reset line MBRST 0 266; and pixels of reset group 276 are connected to reset line MBRST P 268.

The pixels of the pixel array can be divided in many ways. For example, the pixels can be divided into groups with equal number of rows (or columns, or pixels or sub-blocks of pixels). As shown in the figure, assuming the pixels array has M rows, the pixel array can be equally divided into M/(i+1) groups with each group comprising (i+1) rows and i being 31 or any desired values. Pixels of each reset group are connected to one of a set of reset lines MBRST 0 to MBRST P. The reset lines are connected to reset driver 164, which can be a DAD reset driver by Texas Instrument, Inc.

Figure 25:
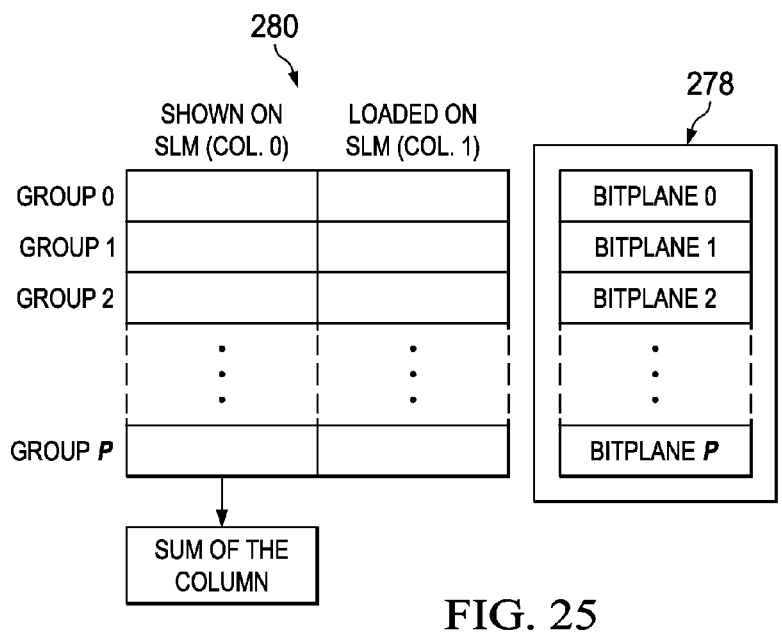

Given the pixel reset groups, bitplanes are loaded to the corresponding reset groups of pixels for being displayed. The number of off-state pixels in each bitplane being displayed by the pixels of the spatial light modulator can then be calculated, as schematically illustrated in FIG. 25. Referring to FIG. 25, at a particular time, a set of bitplanes 278 comprising bitplanes 0, 1, 2 through P are loaded and displayed by the pixels of the spatial light modulator. Each bitplane of the set of bitplanes 278 corresponds to a reset group of pixels numbered as reset group 0, 1, 2, through P, as shown in the figure. It is noted that the bitplanes numbered as 1 through P in this example may or may not have the same significance. Before counting the number of off-state pixels in the bitplanes being displayed by the pixels of the spatial light modulator, cells of column 1 of the counter table (280) are set to initial values, such as 0 or any other predetermined values. At each time a bitplane is loaded to a group of pixels of the spatial light modulator, the value of the corresponding cell in column 1 is incremented by 1 for each off-state pixel in the loaded bitplane. Taking an example wherein the reset group 0 of bitplane 0 has 20 off-state pixels, the cell corresponding to reset group 0 in column 1 of the counter table (180) has a value of 20 after bitplane 278 is loaded to the reset group 0 of the spatial light modulator. When the pixels of the reset groups (e.g. reset group 0) are reset based on the loaded bitplanes (e.g. bitplane 0), all values in the cells of column 1 of counter table 180 are shifted to the corresponding cells in column 0 followed by resetting the values of the cells in column 1 to their initial values. By summing up the values of cells in column 0, the total number of off-state pixels of the bitplanes being displayed by the pixels of the spatial light modulator can be obtained. This value is delivered to clock speed calculator 258 in FIG. 23.

In another example wherein a set of bitplanes is derived from the desired image with each bitplane being a collection of all pixel data bits of the same significance, calculation of the number of off-state pixels of a bitplane being displayed can also be performed using the counter table (180). Specifically, the counter table may be adapted such that each of columns 1 and 0 has one cell. After loading a bitplane to the entire array of pixels of the spatial light modulator, the cell in column 1 of the counter table (280) is incremented by 1 from its initial value for each off-state in the loaded bitplane. After the pixels of the spatial light modulator are reset based on the loaded bitplane, the value of the cell in column 1 can be shifted to the cell in column 0 followed by resetting the cell in column 1 to its initial value. The resulted value in the cell in column 0 is the total number of off-state pixels in the bitplane being displayed. Such obtained total number of off-state pixels is delivered to the clock speed calculator in FIG. 23.

It is noted that the above described off-state pixel calculation method using a counter table is only one of many possible ways. Many other methods using different counter tables or even without using a counter table are also applicable.

Referring again to FIG. 23, clock speed calculator 258 calculates the adjusted clock speed for the spatial light modulator using equations 7 and 8 with the calculated average pixel values A, and the number of off-state pixels $n_{off}$ in the bitplane or bitplanes being displayed. The calculated speed is sent to clock adjustor 260 that is capable of picking up the clock signals for the spatial light modulator and adjusting the clock signals based on the calculated speed from clock speed calculator 258. The adjusted clock speed is delivered to controller 262 that controls operations of the spatial light modulator (108) based on the received clock speed from clock adjustor 260.

Figure 26:
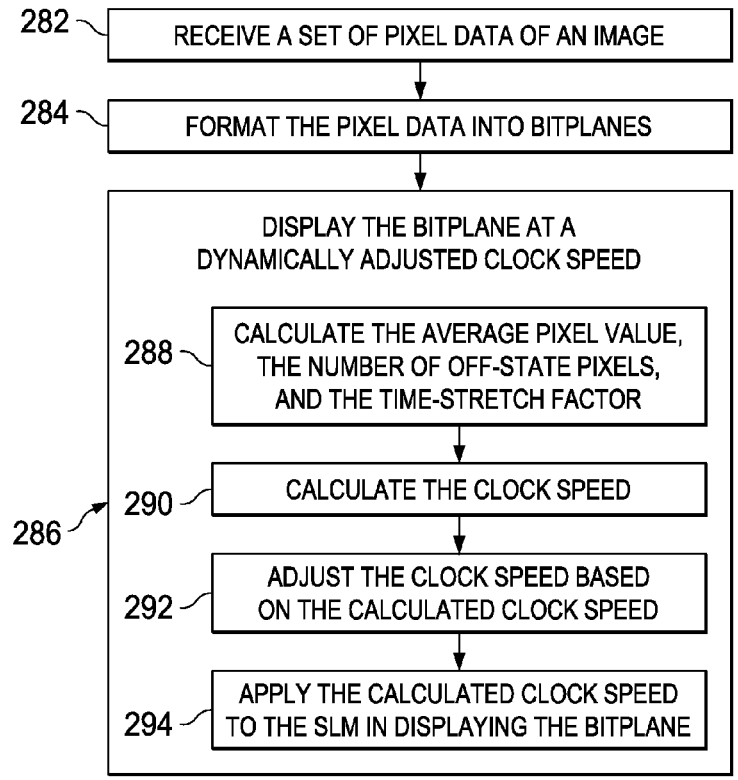
FIG. 26 is a flow chart having steps executed in displaying bitplanes with adjusted clock speed in the presence of off-state light recycling.

As an example, FIG. 26 illustrates a flow chart having steps executed for displaying bitplanes at different clock speeds. Referring to FIG. 26, a set of pixel data of an image or an image frame of a sequence of video frames is received at step 282. The pixel data are formatted to a set of bitplanes according to a pre-determined bitplane format, such as binary and non-binary bitplane formats (step 284). Each set of bitplanes corresponds to a color image component when the input image is a color image. The set of bitplanes is then displayed by the pixels of the spatial light modulator at different clock speeds (step 286), which further comprises steps 288 through 294. At step 288, the average pixel value $A_i$ of each color image component (when the input image is a color image) or the average pixel value of the input grayscale image; the total number of off-state pixels $n_{off}$ in the bitplane or bitplanes being displayed by the pixels of the spatial light modulator; and the time stretch factor E are calculated. Given the above calculated average pixel value, total number of off-state pixels, and the time-stretch factor E, the clock speed for displaying the specific bitplane or a specific group of bitplanes (e.g. group 278 in FIG. 25) by the spatial light modulator is calculated based on equations 7 and 8. The clock speed to which operations of the spatial light modulator are synchronized to is adjusted at step 292. The adjusted clock speed is then applied to the spatial light modulator for displaying the specific bitplane. The above displaying process (step 286) is repeated for all bitplanes for each color image component; and for all bitplanes of all color image components. The process flows back to step 282 for the next input image.

It is noted that calculation of the average pixel value is independent from other calculations until the calculation of the time-stretch factor E at step 288, and can alternatively be performed at any time prior to step 288 wherein the time-stretch factor E is calculated but after step 282 wherein pixel data are received. For example, the average pixel value can be performed before formatting the pixel data into bitplanes (step 284) and after receipt of the pixel data (step 282).

Figure 27:
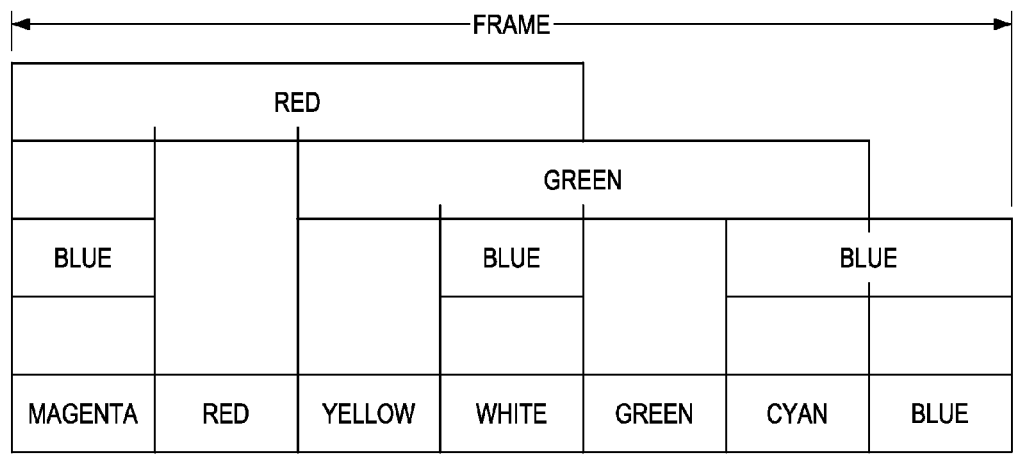
FIG. 27 schematically illustrates an exemplary sequence of color duty cycles.

The method as discussed above with reference to the flow chart in FIG. 26 is not only applicable to color duty cycles that are composed of primary colors (there is no color that is a combination of other colors in the sequence), but is also applicable to any other color duty cycles that are composed of secondary colors (a color that is a combination of other colors in the sequence), such as a color duty sequence of red (R), green (G), blue (B), cyan (C), yellow (Y), magenta (M), and white (W) colors. The secondary colors in a color duty cycle sequence have many advantages than color duty cycle sequences otherwise. This arises from the fact that the secondary colors in a color duty sequence are often obtained by overlapping the illumination time periods of illuminators in the display system. FIG. 27 schematically illustrates an exemplary overlapping scheme by assuming that the display system employs illuminators emitting red, green, and blue colors. It will be appreciated by those skilled in the art that the following discussion is for demonstration purpose, and should not be interpreted as a limitation. Many other variations within the scope of this disclosure are also applicable. For example, the display system may employ illuminators capable of emitting other colors, such as colors selected from red, green, blue, yellow, cyan, magenta, and white. The secondary colors may also be obtained by many other ways, such as a color filter comprising a set of transparent color segments that comprise the secondary colors.

Referring to FIG. 27, during a frame time period, red, green, and blue colors exhibit overlaps resulting in a sequence of color duty cycles comprising secondary colors of yellow, cyan, magenta, and white. As a consequence of the overlap, the total ON-time of the R, G, and B illuminators is greater than the frame time period, which results in brighter full-on white when the sequence of color duty cycles is applied to illuminating the spatial light modulator for projecting desired images on a screen. The profile of the color duty cycle sequence, including relative positions and time periods of colors in the sequence, is determined by the sequence and duration of turning on and turning off the individual illuminators. In general, the sequence can be of any desired profiles. For example, the sequence can have a profile that is substantially determined by the BrilliantColor™ algorithm from Texas Instruments, Inc. Given the color duty sequence, bitplanes for each color of the sequence are derived and displayed at different clock speed, as schematically illustrated in FIG. 28a through FIG. 28c.

Figure 28A:
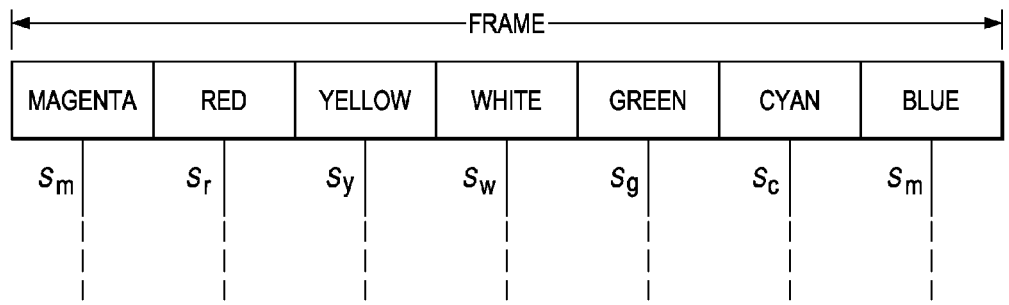
FIG. 28$a$ through FIG. 28$c$ illustrate an exemplary method for adjusting the sequence of color duty cycles in FIG. 27 so as to display bitplanes at adjusted clock speeds in the presence of off-state light recycling.
Figure 28B:
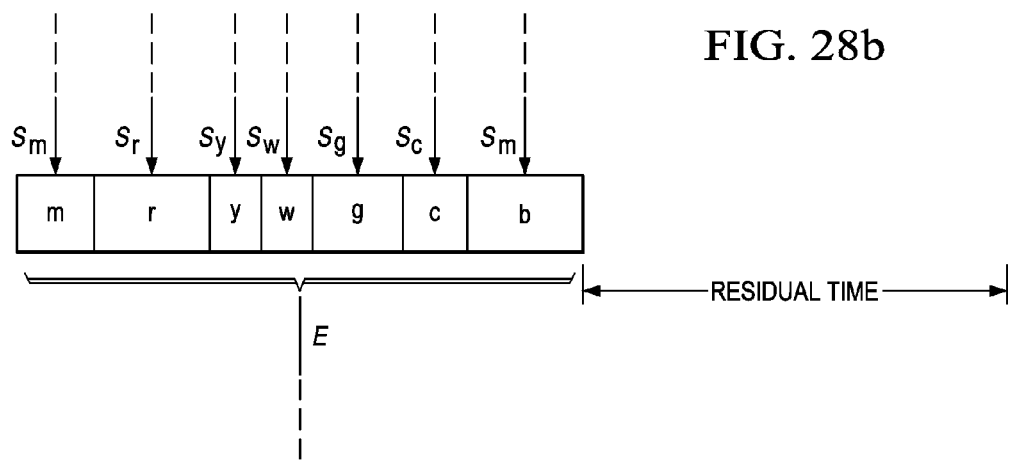
Figure 28C:
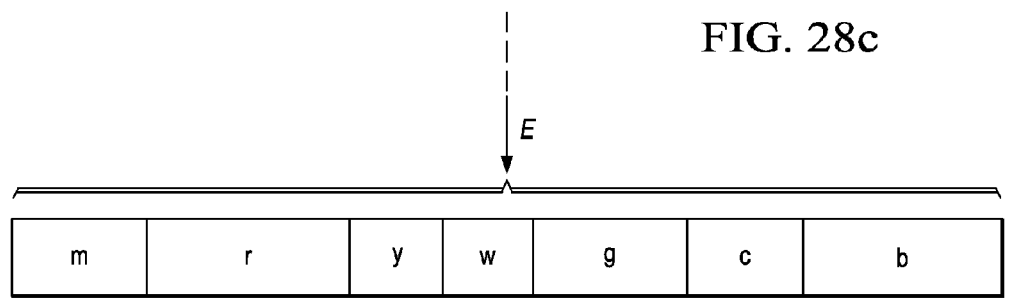

Referring to FIG. 28a, the color duty cycle of magenta (M), red (R), yellow (Y), white (W), green (G), cyan (C), and blue (B) fits in a frame time period. The time periods of the color duty cycles are respectively scaled down based on scaling factors $S_m$, $S_r$, $S_y$, $S_w$, $S_g$, $S_c$, and $S_b$ as illustrated in FIG. 28b. The scaling factors are determined based on the gains calculated from the off-state recycling of the bitplanes associated with the color duty cycles, as discussed above with reference to FIG. 22a through FIG. 22c. The scaled sequence of duty cycles are then uniformly stretched by stretching factor E so as to fit into the entire frame time period, as illustrated in FIG. 28c.

Similar to that discussed above with reference to FIG. 22a through FIG. 22c, bitplanes are derived from the desired image for each color of the sequence of color duty cycles illustrated in FIG. 28a. Compression of the color duty sequence as illustrated in FIG. 28b can be achieved by designing the pulse-width-modulation sequence such that the pulse-width-modulation sequence can be operated within a time T that is substantially $T_{frame} \times I_o/I_{max}$, wherein $I_o$ is the intensity defined in equation 1; and $I_{max}$ is the maximum value of I as described in equation 1. Each color duty cycle can then be locally stretched to the exact desired time through adjusting the clock speed of the spatial light modulator. Globally stretching the color duty cycles as illustrated in FIG. 28c can be also accomplished through adjusting the clock speed of the spatial light modulator of the display system. The derived bitplanes can then be displayed by the spatial light modulator based on the stretched color duty cycles using the clock dropping technique so as to obtain brightness enhanced image on the screen.

As an alternative feature, the brightness can be further improved by re-distributing energies among the colors of the sequence of color duty cycles while maintaining the color consistency of the image on the screen but with enhanced brightness. This arises from the fact that a mixture of primary colors (e.g. R, G, and B) can be represented by the corresponding secondary color (or white). For example, a mixture of the same amount of R, G, and B colors can be represented (replaced) by white color. A mixture of R and G colors can be represented (or replaced) by yellow color. Therefore, an energy distribution of an image pixel over a color duty cycle having secondary colors and white can be equivalently represented by another energy distribution over the same color duty cycle sequence. For enhancing the brightness of the displayed image, energy distribution can be performed in favor of the energy in the white and secondary colors, as will be discussed in the following with reference to FIG. 29a and FIG. 29b.

Figure 29A:
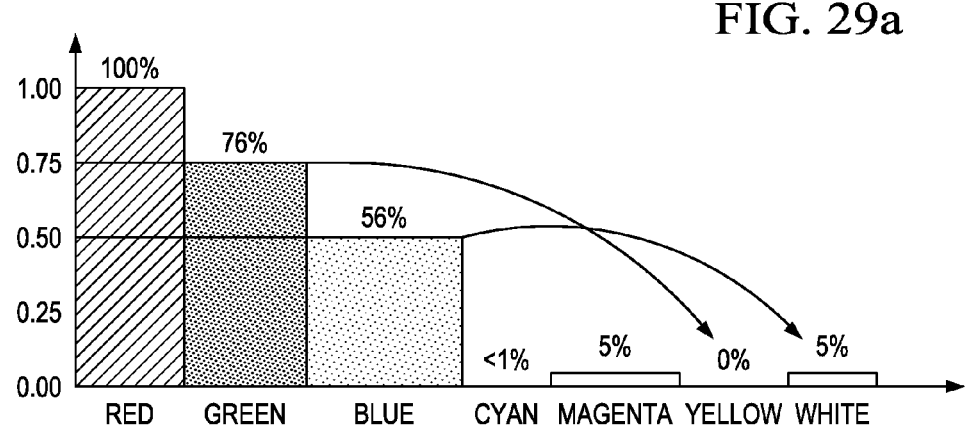
FIG. 29$a$ and FIG. 29$b$ schematically illustrate an exemplary method of re-distributing energies in the color image components associated with the sequence of color duty cycles in FIG. 27.

Referring to FIG. 29a, an exemplary energy distribution over a sequence of color duty cycles for single image pixel n is schematically illustrated therein with the duty cycle sequence comprising red, green, blue, cyan, magenta, yellow, and white. The vertical axis plots the pixel value, normalized by the duty cycle of that color, for the colors listed on the horizontal axis. In the example shown in FIG. 29a, image pixel n is sequentially displayed with 100% red color, 76% green, 56% blue, less than 1% cyan, 5% magenta, 0% yellow, and 5% white. The same unit amount of red, green, and blue colors, which is equal to or less than the minimum pixel values of red, green, and blue, can be transferred to the white segment so as to increase the value of the white color; and the transferred amount is reduced from the red, green, and blue colors. This transfer process can be expressed in equations 9.

$$W_1 = W_0 + \mathrm{Min}(R_0, G_0, B_0)$$

$$R_1 = R_0 - \mathrm{Min}(R_0, G_0, B_0)$$

$$G_1 = G_0 - \mathrm{Min}(R_0, G_0, B_0)$$

$$B_1 = B_0 - \mathrm{Min}(R_0, G_0, B_0) \quad \text{(Eq. 9)}$$

In equation 9, $W_1$ and $W_0$ are the pixel values of the white color after and before the energy transfer. $\mathrm{Min}(R_0, G_0, B_0)$ is the minimum value of the R, G, and B pixel values before the energy transfer. $R_1$ and $R_0$ are the pixel values of the red color after and before the energy transfer. $G_1$ and $G_0$ are the pixel values of the green color after and before the energy transfer; and $B_1$ and $B_0$ are the pixel values of the blue color after and before the energy transfer.

After the above energy transfer, another same amount of red and green colors can be transferred to the yellow color, which can be expressed as equation 10.

$$R_2 = R_1 - \mathrm{Min}(R_1, G_1)$$

$$G_2 = G_1 - \mathrm{Min}(R_1, G_1)$$

$$Y_1 = Y_0 + \mathrm{Min}(R_1, G_1) \quad \text{(Eq. 10)}$$

In equation 10, $\mathrm{Min}(R_1, G_1)$ is the minimum value of the $R_1$ and $G_1$ pixel values. $R_2$ and $R_1$ are the pixel values of the red color after and before the energy transfer to yellow. $G_2$ and $G_1$ are the pixel values of the green color after and before the energy transfer to yellow; and $Y_1$ and $Y_0$ are the pixel values of the yellow color after and before the energy transfer.

Figure 29B:
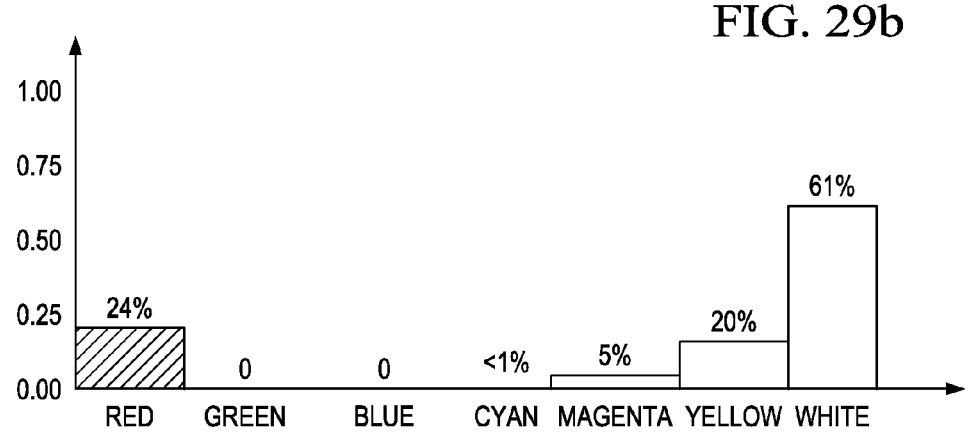

The energy distribution after the above energy transfers is schematically illustrated in FIG. 29b. Referring to FIG. 29b, the pixel value of the red color is 24%; and the pixel value of green and blue colors are zero. Cyan color does not change its pixel value. The pixel value of the yellow color is increased from 0 to 20%; and the pixel value of the white color is increased from 5% to 61%.

The above energy re-distribution is performed for all image pixels. If possible, two additional energy transfers are performed that are similar to that of equation 10, but for cyan and magenta. Specifically, after any possible yellow transfer has been performed, the minimum of the resulting green and blue pixel value is transferred to cyan. Subsequently, the minimum of the resulting red and blue pixel value is transferred to magenta. Based on the image after the energy re-distribution, bitplanes are derived for image components with colors in the color duty cycle sequence. Off-state recycling gains are calculated from the off-state recycling of the image components with colors in the color duty sequence. The calculated gains are used to determine the scaling factors for scaling the sequence of color duty cycles and pulse-width-modulation sequence as discussed above with reference to FIGS. 28a and 28b.

In re-distributing energies among the colors of the sequence of color duty cycles, the energy re-distribution may be subject to constraints to maintain proper image presentations. For example, the amount of energy moved into a particular color duty cycle is desired to be equal to or less than the maximum pixel value allowed by the particular color duty cycle such that the total energy of the particular color duty cycle (including the moved amount) can be achieved by displaying the corresponding bitplanes. This arises from that the fact that, when the time period of a particular color duty cycle, such as the white color duty cycle, is very small the total amount of energy (including the moved energy from the R, G, B colors) may not be properly achieved by displaying the corresponding bitplanes during the short duty cycle time period. As a consequence, the amount of energy to be moved to the particular color, such as white is desired to be determined by the maximum value allowed by the time period of the specific color duty cycle. In general, it is preferred, though not required, that the energy re-distribution preferably starts from moving energies into the white color duty cycle; and move as much energy from the primary colors (e.g. R, G, and B) into the white color duty cycle; and then performing energy redistribution towards other secondary colors. Alternatively, energy redistribution can be performed from moving energies into one or more secondary colors, then moving energies into the white color duty cycle.

In addition to the above constraint, other constraints may apply, which are listed as follows. In the following inequalities, r, g, and b represent the input pixel's RGB values, normalized to a value in the range from 0 to 1; and R, G, B, C, M, Y, and W represent the duty cycle of each color illuminant such that the sum of R, G, B, C, M, Y, and W is 1.

| | | | |
|---|---|---|---|
| g <= G + C + Y + W; | r <= R + M + Y + W; | b <= B + M + C + W; | g − r <= G + C; |
| r − g <= R + M; | r − b <= R + Y; | b − r <= B + C; | g − b <= G + Y; |
| b − g <= B + M; | r − g − b <= R; | b − r − g <= B; | g − r − b <= G; |
| g + b − r <= G + 2C + B + W; | | g + r − b <= G + R + 2Y + W; | |
| r + b − g <= R + B + 2M + W; | r >= 0; | g >= 0; and b >= 0. | |

In performing the energy re-distribution, each of the above constraints can be checked to ensure that no constraints are violated. If a violation occurs in moving an amount of energies, the amount of energies to be moved is desired to be adjusted to remove the violation. It is noted that the above discussion with reference to FIG. 29a and FIG. 29b are for demonstration purpose, and should not be interpreted as a limitation. Any variations within the scope of this disclosure are also applicable. Specifically, the energy distribution shown in FIG. 29a is only an example for a particular image pixel. In fact, an image pixel may have any energy distributions different from that shown in FIG. 29a.

It will be appreciated by those of skill in the art that a new and useful off-state light recycling mechanism and a pulse-width-modulation technique for use in display systems employing an off-state recycling mechanism have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

APPENDIX A

Pseudo-code of an exemplary process for deriving bitplanes

START
$\epsilon$ = recycling efficiency
for each frame
    for each color
        Calculate Average Picture Level for each color in linear space
        APL(color) = sum(degamma(pixels(color))) / total number of pixels
        Find the recycling gain for this color channel
        gain(color) = 1 / (1−$\epsilon$*(1−APL(color)))
    end (for each color)
    Find the gain for this frame (the minimum gain of the three color channels)
    $gain_{frame}$ = min(gain)
    for each color
        Initialize LEVEL-COUNT TABLE by creating a histogram of the input levels
        (0..255) along with the linear light level after the frame gain has been applied:

| Input Level | Gained Linear Level | Pixel Count |
|---|---|---|
| 0 | = $gain_{frame}$ *degamma(input level 0) | # pixels at code 0 |
| 1 | = $gain_{frame}$ *degamma(input level 1) | # pixels at code 1 |
| ... | ... | ... |
| 255 | = $gain_{frame}$ *degamma(input level 255) | # pixels at code 255 |

Initialize the time remaining in the frame
    time_remaining = 1
    for each bitplane from MSB to LSB
        Calculate the duration of this bitplane (out of a total time of 1)
        bit_time = time_remaining*(1/(2−log(1− $\epsilon$)))
        time_remaining = time_remaining − bit_time
        for each input level transition from 0→1 to 254→255    (could be
            replaced by a smart search algorithm, such as a binary search,
            to find first level above $gain_{bitplane}$)
            Determine fraction of pixels below this level transition
            fraction_below = cumulative_sum(pixel_count(0 to level)) /
    total number of pixels
            Determine recycling gain for this bitplane if this fraction of
    pixels are off
            $gain_{bitplane}$ = bit_time*(1./(1−($\epsilon$*fraction_below)))
            if (Gained Linear Level for input level > $gain_{bitplane}$)
                All pixels with Gained Linear Level at or above this
                    upper level threshold will be ON for this bitplane
                Assign ON (1) for all levels of this color above current
                level for this bitplane into ENUMERATION
                TABLE:

| Input Data Values | | Bitplane ON/OFF | | | | | |
|---|---|---|---|---|---|---|---|
| | | MSB 1 | 2 | 3 | ... | ... | LSB n | Residual (float) |
| Red | 0 | 0 (off) | 0 | 0 | 0 | 0 | 0 | |
| | 1 | 0 | 0 | 0 | 0 | 1 | 0 | |
| | 2 | 0 | 0 | 1 | 0 | 1 | 0 | |
| | 3 | 0 | 0 | 1 | 0 | 1 | 1 | |
| | ... | 0 | 1 | 1 | 0 | 1 | 1 | |
| | ... | ... | ... | ... | ... | ... | ... | |

APPENDIX A-continued

Pseudo-code of an exemplary process for deriving bitplanes

|  |  |  |  |  |  |  |  |
|---|---|---|---|---|---|---|---|
|  | 255 | 1 (on) | 1 | 1 | 1 | 1 | 1 |
| Green | 0 | 0 | 0 | 0 | 0 |  |  |
|  | 1 | 0 | 0 | 1 | 0 |  |  |
|  | 2 | 1 | 0 | 1 | 0 |  |  |
|  | 3 | 1 | 0 | 1 | 1 |  |  |
|  | ... | 1 | 0 | 1 | 1 |  |  |
|  | ... | ... | ... | ... | ... | ... | ... |
|  | 255 | 1 | 0 | 1 | 1 |  |  |
| Blue | 0 |  |  |  |  |  |  |
|  | 1 |  |  |  |  |  |  |
|  | 2 |  |  |  |  |  |  |
|  | 3 |  |  |  |  |  |  |
|  | ... |  |  |  |  |  |  |
|  | ... | ... | ... | ... | ... | ... |  |
|  | 255 |  |  |  |  |  |  |

Update the LEVEL-COUNT TABLE by subtracting the amount of light displayed during this bitplane from the Gained Linear Level for each input level:

| Input Level | Gained Linear Level | Pixel Count |
|---|---|---|
| 0 | = previous − $gain_{bitplane}$ (if bitplane ON at this level) = previous (if bitplane OFF) | # pixels at code 0 |
| 1 | = previous − $gain_{bitplane}$ (if bitplane ON at this level) = previous (if bitplane OFF) | # pixels at code 1 |
| ... | ... | ... |
| 255 | = previous − $gain_{bitplane}$ (if bitplane ON at this level) = previous (if bitplane OFF) | # pixels at code 255 |

Sort the LEVEL-COUNT TABLE in ascending order based on Gained Linear Level, keeping each row intact.
      BREAK from for each level transition loop
    else
      Assign OFF (0) for this level of this color for this bitplane in ENUMERATION TABLE.
    end if (Gained Linear Level for input level > $gain_{bitplane}$)
  end (for each input level transition)
end (for each bitplane)
Use STM dithering to achieve the residual intensities:
  The values remaining in the LEVEL-COUNT TABLE after the LSB level has been calculated represent the intensities to be represented via STM.

|  |  | Bitplane ON/OFF |  |  |  |  |  |
|---|---|---|---|---|---|---|---|
| Input Data Values | MSB 1 | 2 | 3 | ... | ... | LSB n | Residual (float) |
| Red 0 | 0 (off) | 0 | 0 | 0 | 0 | 0 | = Gained Linear Level from LEVEL-COUNT TABLE after LSB |
| 1 | 0 | 0 | 0 | 0 | 1 | 0 | ... |
| 2 | 0 | 0 | 1 | 0 | 1 | 0 | ... |
| ... | ... | ... | ... | ... | ... | ... | ... |

Calculate the light intensity of the STM bitplane by determining, on average, how many pixels will be ON. This is a function of the mean of the residual values.
$APL_{residual}$ = sum(Gained Linear Levels * pixel count) / total number of pixels
$fraction\_OFF_{STM}$ = ($APL_{residual}$ − time_remaining) / ($APL_{residual}$ * $\epsilon$ − time_remaining)
$Intensity_{STM}$ = time_remaining * (1 / (1− $\epsilon$*$fraction\_OFF_{STM}$))
Scale the residual values by this STM light intensity to get a number between 0 and 1 that STM can use for thresholding.
  for each Input Data Level
    Residual = Residual / $Intensity_{STM}$
  end (for each Input Data Level)
end (for each color)

APPENDIX A-continued

Pseudo-code of an exemplary process for deriving bitplanes

With the ENUMERATION TABLE completely filled in (including the scaled residual values), calculate bitplanes and perform STM as normal.
end (for each frame)

We claim:

1. A method of allocating display times comprising:
    representing image data for an image to be displayed during a frame time as a sequence of one or more bit planes for one or more colors;
    calculating a recycling gain for each bit plane;
    compressing each bit plane based on the recycling gain;
    determining an unused portion of the frame time based on the compressed bit planes; and
    stretching the bit planes to utilize the unused portion of the frame time.

2. The method of claim 1, comprising:
    displaying the stretched bit planes.

3. The method of claim 1, wherein the one or more colors comprise primary colors.

4. The method of claim 1, wherein the one or more colors comprise primary colors and representing image data comprises receiving image data.

5. The method of claim 1, comprising:
    receiving the image data representing an input set of colors; and
    converting the image data to image data representing the one or more colors.

6. The method of claim 5, wherein converting the image data comprises converting the image data to image data representing both colors generated by one or more color sources individually and colors generated by one or more color sources in combination.

7. The method of claim 5, wherein converting the image data comprises converting the image data to image data representing both colors generated by one or more color sources individually and colors generated by one or more color sources in combination, and wherein the image data representing colors generated by one or more color sources in combination is maximized.

8. A method of allocating display times comprising:
    receiving image data for an image to be displayed during a frame time using one or more primary colors;
    converting the image data to a sequence of bit planes for a set of colors including the primary colors and secondary colors;
    calculating a recycling gain for each bit plane;
    compressing each bit plane based on the recycling gain;
    determining an unused portion of the frame time based on the compressed bit planes; and
    stretching the bit planes to utilize the unused portion of the frame time.

9. The method of claim 8, comprising:
    displaying the stretched bit planes.

10. The method of claim 8, wherein converting the image data increases the contribution of the secondary colors.

11. The method of claim 8, wherein converting the image data maximizes the contribution of the secondary colors.

* * * * *